US012789512B2

(12) United States Patent
Nakayama et al.

(10) Patent No.: US 12,789,512 B2
(45) Date of Patent: Nov. 10, 2026

(54) DECORATIVE SHEET AND DECORATIVE RESIN MOLDED ARTICLE

(71) Applicant: Dai Nippon Printing Co., Ltd., Tokyo (JP)

(72) Inventors: Hiroaki Nakayama, Tokyo (JP); Nobuo Saitou, Tokyo (JP); Minoru Ariyama, Tokyo (JP); Yoshiyuki Meiki, Tokyo (JP); Sakie Kataoka, Tokyo (JP); Kenta Takayama, Tokyo (JP); Daisuke Yokoyama, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 17/915,604

(22) PCT Filed: Mar. 31, 2020

(86) PCT No.: PCT/JP2020/014964

§ 371 (c)(1),
(2) Date: Sep. 29, 2022

(87) PCT Pub. No.: WO2021/199360

PCT Pub. Date: Oct. 7, 2021

(65) Prior Publication Data

US 2023/0133852 A1 May 4, 2023

(51) Int. Cl.
*B32B 3/30* (2006.01)
*B29C 45/14* (2006.01)
(Continued)

(52) U.S. Cl.
CPC ........ *B32B 27/08* (2013.01); *B29C 45/14008* (2013.01); *B32B 3/30* (2013.01);
(Continued)

(58) Field of Classification Search
CPC ........... B32B 27/08; B32B 3/30; B32B 37/24; B32B 2250/02; B32B 2250/24;
(Continued)

(56) References Cited

U.S. PATENT DOCUMENTS

2019/0248100 A1* 8/2019 Horio ...................... B32B 9/042
2020/0061885 A1* 2/2020 Fujii ...................... B29C 45/14

FOREIGN PATENT DOCUMENTS

JP S50-19132 B1 7/1975
JP S61-017255 B2 5/1986
(Continued)

OTHER PUBLICATIONS

Machine translation of JP 2019-064261 Kitahara et al. Obtained from the EPO website on Jul. 20, 2023. (Year: 2019).*
(Continued)

*Primary Examiner* — Megha M Gaitonde
(74) *Attorney, Agent, or Firm* — Troutman Pepper Locke LLP; James E. Armstrong, IV

(57) ABSTRACT

The present invention provides a decorative sheet which is provided with a relief pattern in the outer surface, while having excellent chemical resistance, wherein the relief pattern is suitably maintained even after molding. A decorative sheet which is provided with a relief pattern in the outer surface, while sequentially having, from the outer side, at least a first protective layer that constitutes the relief pattern and a second protective layer. The first protective layer is formed of a cured product of a resin composition that contains an ionizing radiation curable resin and a thermoplastic resin; and the second protective layer is formed of a cured product of an ionizing radiation curable resin composition that contains a polycarbonate (meth)acrylate.

19 Claims, 1 Drawing Sheet

(51) Int. Cl.

| | |
|---|---|
| ***B32B 27/08*** | (2006.01) |
| ***B32B 37/24*** | (2006.01) |
| *B29K 33/00* | (2006.01) |
| *B29K 669/00* | (2006.01) |

(52) U.S. Cl.
CPC .......... *B32B 37/24* (2013.01); *B29K 2033/08* (2013.01); *B29K 2669/00* (2013.01); *B32B 2250/02* (2013.01); *B32B 2250/24* (2013.01); *B32B 2305/72* (2013.01); *B32B 2307/538* (2013.01); *B32B 2307/54* (2013.01)

(58) Field of Classification Search
CPC .......... B32B 2305/72; B32B 2307/538; B32B 2307/54; B29C 45/14008; B29C 45/14; B29K 2033/08; B29K 2669/00; Y10T 428/24479; Y10T 428/24504; Y10T 428/24521; Y10T 428/24537; Y10T 428/24612; Y10T 428/24628; Y10T 428/24942; Y10T 428/2495
USPC ................ 428/156, 161, 172, 174, 212, 213
See application file for complete search history.

(56) References Cited

FOREIGN PATENT DOCUMENTS

| | | | | | |
|---|---|---|---|---|---|
| JP | H071892 | A | * | 1/1995 | |
| JP | 2004-322501 | A | | 11/2004 | |
| JP | 2018058222 | A | * | 4/2018 | |
| JP | 2019-064261 | A | | 4/2019 | |
| JP | 2020-049771 | A | | 4/2020 | |
| WO | WO-2018062340 | A1 | * | 4/2018 | ............. B32B 27/36 |
| WO | WO-2018181775 | A1 | * | 10/2018 | ....... B29C 45/14688 |

OTHER PUBLICATIONS

Diethylene glycol di(meth)acrylate obtained from PubChem on Jul. 17, 2025. (Year: 2025).*
Machine translation of JP 2018-058222 Kataoka et al. Obtained from EPO. (Year: 2018).*
Machine translation of JPH071892. (Year: 1995).*
International Search Report mailed Jun. 9, 2020, issued for PCT/JP2020/014964.

* cited by examiner

DECORATIVE SHEET AND DECORATIVE RESIN MOLDED ARTICLE

TECHNICAL FIELD

The present disclosure relates to a decorative sheet and a decorative resin molded article, the decorative sheet and the decorative resin molded article having an uneven shape and having excellent moldability and chemical resistance.

BACKGROUND ART

Decorative resin molded articles obtained by laminating a decorative sheet on the surface of a resin molded article have been used for vehicle interior parts, building interior materials, home electric appliance housings and the like. Examples of the method for molding such a decorative resin molded article include an insert molding method in which a decorative sheet is molded into a three-dimensional shape by a vacuum molding die in advance, the molded sheet is inserted into an injection molding die, and a fluidized resin is injected into the die to integrate the resin with the molded sheet (see, for example, Patent Document 1); and an injection molding simultaneous decorating method in which a decorative sheet inserted into the mold during injection molding is integrated with a molten resin injected into a cavity by injection molding, so that a surface of a resin molded article is decorated (see, for example, Patent Documents 2 and 3).

In recent years, decorative resin molded articles having various designability have been required as consumer needs have diversified. For following such diversified consumer needs, development of a decorative resin molded article having a design impression, a touch feeling and the like based on an uneven shape on a surface thereof has been desired.

For production of a decorative resin molded article having an uneven shape on a surface thereof, for example, a decorative sheet having an uneven shape formed on a surface thereof in advance is used. However, production of a decorative resin molded article using a decorative sheet having an uneven shape has a problem that it is difficult to maintain the uneven shape, for example, the uneven shape is deformed or eliminated by heat or pressure when the decorative sheet is subjected to injection molding or preceding premolding (vacuum molding).

PRIOR ART DOCUMENT

Patent Documents

Patent Document 1: Japanese Patent Laid-open Publication No. 2004-322501

Patent Document 2: Japanese Patent Publication No. 50-19132

Patent Document 3: Japanese Patent Publication No. 61-17255

SUMMARY OF THE INVENTION

Problems to be Solved by the Invention

As described above, development of a decorative resin molded article having a design impression, a touch feeling and the like based on an uneven shape on a surface thereof has been desired in recent years, and production of a decorative resin molded article using a decorative sheet having an uneven shape has a problem that it is difficult to maintain the uneven shape, for example, the uneven shape is deformed or eliminated by heat or pressure when the decorative sheet is subjected to injection molding or preceding premolding (vacuum molding).

In recent years, a decorative sheet to be used for production of a decorative resin molded article has been required to have not only moldability but also a function of giving the decorative resin molded article contamination resistance with respect to various products that are used in the everyday life. Particularly, in recent years, skincare products such as sunscreen cosmetics, alcohol-containing chemicals, and the like have tended to be often used, and the frequency has increased at which the skin coated with such a skin care product comes into contact with a decorative resin molded article, or an alcohol-containing chemical is deposited on a decorative resin molded article. Thus, a decorative sheet has been strongly required to have further excellent chemical resistance to chemicals having high surface erodibility to resins.

Under these circumstances, a main object of the present disclosure is to provide a decorative sheet having an uneven shape on an outer surface thereof, the decorative sheet having the uneven shape suitably maintained even when molded, and having excellent chemical resistance. Further, an object of the present disclosure is to provide a decorative resin molded article using the decorative sheet, and a method for producing the decorative resin molded article.

Means for Solving the Problem

The inventors of the present disclosure have extensively conducted studies for solving the above-described problems. Resultantly, the inventors have found that when in a decorative sheet having an uneven shape on an outer surface thereof, at least a first protective layer forming the uneven shape, and a second protective layer are provided in this order from the outer surface, the first protective layer is formed of a cured product of a resin composition containing an ionizing radiation curable resin and a thermoplastic resin, and the second protective layer is formed of a cured product of an ionizing radiation curable resin composition containing polycarbonate (meth)acrylate, the decorative sheet has the uneven shape suitably maintained even when molded, and exhibits excellent chemical resistance.

The inventors of the present disclosure have also found that when in a decorative sheet having an uneven shape on an outer surface thereof, at least a first protective layer forming the uneven shape, and a second protective layer are provided in this order from the outer surface, the first protective layer is formed of a cured product of a resin composition containing an ionizing radiation curable resin and a thermoplastic resin, the second protective layer is formed of a cured product of an ionizing radiation curable resin composition, and the second protective layer has a tensile elastic modulus of 500 MPa or less at 23° C., and has no thermal softening point at 200° C. or lower, the decorative sheet has the uneven shape suitably maintained even when molded, and exhibits excellent chemical resistance.

The present disclosure is an invention that has been completed by further conducting studies based on the above-mentioned findings.

That is, the present disclosure provides an invention of an aspect as described below.

Item 1. A decorative sheet having an uneven shape on an outer surface thereof, the decorative sheet including at least a first protective layer forming the uneven shape, and a second protective layer, in this order from the outer surface, the first protective layer being formed of a cured product of a resin composition containing an ionizing radiation curable resin and a thermoplastic resin, and the second protective layer being formed of a cured product of an ionizing radiation curable resin composition containing polycarbonate (meth)acrylate.

Item 2. A decorative sheet having an uneven shape on an outer surface thereof, the decorative sheet including at least a first protective layer forming the uneven shape, and a second protective layer, in this order from the outer surface, the first protective layer being formed of a cured product of a resin composition containing an ionizing radiation curable resin and a thermoplastic resin, the second protective layer being formed of a cured product of an ionizing radiation curable resin composition, and the second protective layer having a tensile elastic modulus of 500 MPa or less at 23° C., and having no thermal softening point at 200° C. or lower.

Item 3. The decorative sheet according to item 1 or 2, in which the second protective layer has an uneven shape along the uneven shape of the first protective layer.

Item 4. The decorative sheet according to any one of items 1 to 3, in which in the first protective layer, the resin composition contains the ionizing radiation curable resin and the thermoplastic resin at a mass ratio of 10:90 to 25:75.

Item 5. The decorative sheet according to any one of items 1 to 4, in which in the first protective layer, a weight average molecular weight of the thermoplastic resin is in the range of 90000 or more and 150000 or less.

Item 6. The decorative sheet according to any one of items 1 to 5, in which in the first protective layer, a number of functional groups of a monomer contained in the ionizing radiation curable resin is in the range of 2 to 6.

Item 7. The decorative sheet according to any one of items 1 to 6, in which in the first protective layer, a molecular weight of a monomer contained in the ionizing radiation curable resin is in the range of 200 or more and 2000 or less.

Item 8. The decorative sheet according to any one of items 1 to 7, in which a base material layer is laminated on a surface of the second protective layer on a side opposite to the first protective layer.

Item 9. The decorative sheet according to any one of items 1 to 8, in which a primer layer is laminated on a surface of the second protective layer on a side opposite to the first protective layer.

Item 10. The decorative sheet according to any one of items 1 to 9, in which an arithmetic mean roughness Ra of the outer surface is 0.1 μm or more and 100 μm or less.

Item 11. The decorative sheet according to any one of items 1 to 10, which is used in an insert molding method or an injection molding simultaneous decorating method.

Item 12. A decorative resin molded article having an uneven shape on an outer surface thereof, the decorative resin molded article including at least a first protective layer forming the uneven shape, a second protective layer, and a molded resin layer, in this order from the outer surface, the first protective layer being formed of a cured product of a resin composition containing an ionizing radiation curable resin and a thermoplastic resin, and the second protective layer being formed of a cured product of an ionizing radiation curable resin composition containing polycarbonate (meth)acrylate.

Item 13. A decorative resin molded article having an uneven shape on an outer surface thereof, the decorative resin molded article including at least a first protective layer forming the uneven shape, a second protective layer, and a molded resin layer, in this order from the outer surface, the first protective layer being formed of a cured product of a resin composition containing an ionizing radiation curable resin and a thermoplastic resin, the second protective layer being formed of a cured product of an ionizing radiation curable resin composition, and the second protective layer having a tensile elastic modulus of 500 MPa or less at 23° C., and having no thermal softening point at 200° C. or lower.

Item 14. A method for producing a decorative resin molded article, the method including the step of laminating a molded resin layer on a surface of the decorative sheet according to any one of items 1 to 11 on a side opposite to a surface having the uneven shape by injecting a resin.

Advantages of the Invention

According to the present disclosure, it is possible to provide a decorative sheet having an uneven shape on an outer surface thereof, the decorative sheet having the uneven shape suitably maintained even when molded, and having excellent chemical resistance. According to the present disclosure, it is also possible to provide a decorative resin molded article using the decorative sheet, and a method for producing the decorative resin molded article.

EMBODIMENTS OF THE INVENTION

1. Decorative Sheet

Figure 1:
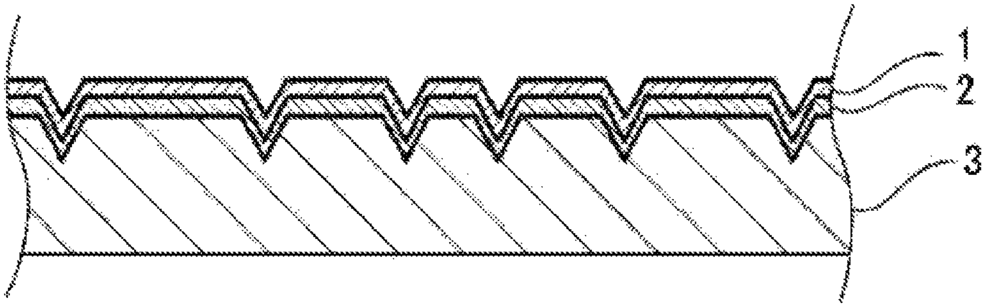
FIG. 1 is a schematic view of a cross-section structure of one form of a decorative sheet of the present disclosure.

A decorative sheet according to a first embodiment of the present disclosure is a decorative sheet having an uneven shape on an outer surface thereof, the decorative sheet including at least a first protective layer forming the uneven shape, and a second protective layer, in this order from the outer surface, the first protective layer being formed of a cured product of a resin composition containing an ionizing radiation curable resin and a thermoplastic resin, and the second protective layer being formed of a cured product of an ionizing radiation curable resin composition containing polycarbonate (meth)acrylate. Since the decorative sheet according to the first embodiment has such a specific configuration, the decorative sheet has the uneven shape suitably maintained even when molded, and can exhibit excellent chemical resistance.

A decorative sheet according to a second embodiment of the present disclosure is a decorative sheet having an uneven shape on an outer surface thereof, the decorative sheet including at least a first protective layer forming the uneven shape, and a second protective layer, in this order from the outer surface, the first protective layer being formed of a cured product of a resin composition containing an ionizing radiation curable resin and a thermoplastic resin, the second protective layer being formed of a cured product of an ionizing radiation curable resin composition, and the second protective layer having a tensile elastic modulus of 500 MPa or less at 23° C., and having no thermal softening point at 200° C. or lower. Since the decorative sheet according to the second embodiment has such a specific configuration, the decorative sheet has the uneven shape suitably maintained even when molded, and can exhibit excellent chemical resistance.

Hereinafter, the decorative sheet according to the first embodiment of the present disclosure and the decorative sheet according to the second embodiment will be described in detail. In the description below, matters common to the first embodiment and the second embodiment are described without being clearly indicated. Matters specific to the first embodiment or the second embodiment are described as being related to the first embodiment or the second embodiment. In this specification, a numerical range indicated by the term "A to B" means "A or more" and "B or less" unless the numerical range is specified by the term "or more" or "or less". For example, the expression of "2 to 15 mm" means 2 mm or more and 15 mm or less. In the present description, the "(meth)acrylate" means an "acrylate" or a "methacrylate", and the same applies to other similar terms. The decorative sheet of the present disclosure is not required to have a pattern layer or the like, and may be, for example, transparent.

Laminated Structure of Decorative Sheet

The decorative sheet of the present disclosure has an uneven shape on an outer surface, thereof, and has a laminated structure in which at least a first protective layer forming the uneven shape, and a second protective layer are laminated in this order from the outer surface.

In the decorative sheet of the present disclosure, a base material layer 3 may be provided on a surface of the second protective layer on a side opposite to the first protective layer for the purpose of, for example, improving the shape retainability of the decorative sheet. If necessary, a primer layer 4 may be provided immediately below a surface of the second protective layer on a side opposite to the first protective layer for improving adhesion between the second protective layer and a layer located below the second protective layer (e.g. the base material layer 3 or a pattern layer 5).

If necessary, the pattern layer 5 may be provided on a surface of the second protective layer on a side opposite to the first protective layer for the purpose of imparting decorativeness. For example, when the base material layer 3 and the primer layer 4 are provided, the pattern layer 5 may be provided between the base material layer 3 and the primer layer 4.

If necessary, a masking layer (not shown) may be provided between the base material layer 3 and the second protective layer 2 for the purpose of suppressing a change or variation in color of the base material layer 3. For example, when the primer layer 4 is provided, the masking layer may be provided between the base material layer 3 and the primer layer 4, and when the pattern layer 5 is provided, the masking layer may be provided between the base material layer 3 and the pattern layer 5.

Further, if necessary, a transparent resin layer (not shown) may be provided on a surface of the second protective layer on a side opposite to the first protective layer for the purpose of improving abrasion resistance (scratch resistance). For example, when the primer layer 4 and the pattern layer 5 are provided, the transparent resin layer may be provided between the pattern layer 5 and the primer layer 4.

Further, in the decorative sheet of the present disclosure, if necessary, a back adhesive layer (not shown) may be provided on a back surface (a surface on a side opposite to the first protective layer 1) of the decorative sheet for the purpose of improving adhesion with a molded resin during molding of the decorative sheet.

Examples of the laminated structure of the decorative sheet of the present disclosure include a laminated structure in which the second protective layer and the first protective layer are laminated in this order; a laminated structure in which the base material layer 3, the second protective layer and the first protective layer are laminated in this order; a laminated structure in which the base material layer 3, the primer layer 4, the second protective layer and the first protective layer are laminated in this order; a laminated structure in which the base material layer 3, the pattern layer 5, the second protective layer and the first protective layer are laminated in this order; a laminated structure in which the base material layer 3, the pattern layer 5, the primer layer 4, the second protective layer and the first protective layer are laminated in this order; and a laminated structure in which the base material layer 3, the pattern layer 5, the transparent resin layer, the primer layer 4, the second protective layer and the first protective layer are laminated in this order.

Figure 2:
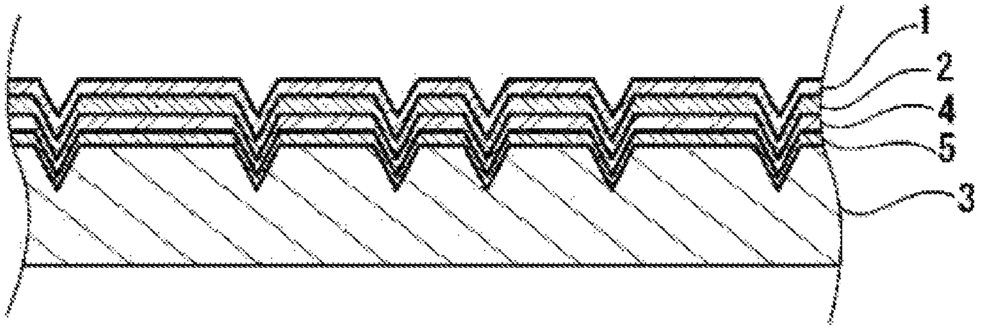
FIG. 2 is a schematic view of a cross-section structure of one form of a decorative sheet of the present disclosure.

FIG. 1 shows a sectional view of a decorative sheet in which the base material layer 3, the second protective layer and the first protective layer are laminated in this order as one aspect of the laminated structure of the decorative sheet of the present disclosure. FIG. 2 shows a sectional view of a decorative sheet in which the base material layer 3, the pattern layer 5, the primer layer 4, the second protective layer and the first protective layer are laminated in this order as one aspect of the laminated structure of the decorative sheet of the present disclosure.

Composition of Each Layer of Decorative Sheet

[Base Material Layer 3]

The base material layer 3 is a resin sheet (resin film) that serves as a support in the decorative sheet of the present disclosure. The resin component which is used for the base material layer 3 is not particularly limited, and may be appropriately selected according to three-dimensional moldability, compatibility with a molded resin, and the like, and a resin film composed of a thermoplastic resin is preferable. Specific examples of the thermoplastic resin include acrylonitrile-butadiene-styrene resins (hereinafter, sometimes referred to as "ABS resins"), acrylonitrile-styrene-acrylic acid ester resins (hereinafter, sometimes referred to as "ASA resins"), acrylonitrile/ethylene-propylene-diene/styrene resins, acrylic resins, polyolefin resins such as polypropylene and polyethylene, polycarbonate resins, vinyl chloride resins and polyethylene terephthalate (PET). Among them, ABS resins and acrylic resins are preferable from the viewpoint of three-dimensional moldability. In addition, the base material layer 3 may be formed of a single-layer sheet of any of these resins, or may be formed of a multiple-layer sheet of the same kind or different kinds of resins.

The bending elastic modulus of the base material layer 3 is not particularly limited. For example, when the decorative sheet of the present disclosure is integrated with a molded resin by an insert molding method, the bending elastic modulus of the base material layer 3 in the decorative sheet of the present disclosure at 25° C. is 500 to 4,000 MPa, preferably 750 to 3,000 MPa. Here, the bending elastic modulus at 25° C. is a value measured in accordance with JIS K 7171. When the bending elastic modulus at 25° C. is 500 MPa or more, the decorative sheet has sufficient rigidity, and has further good surface characteristics and moldability even when subjected to an insert molding method. In addition, when the bending elastic modulus at 25° C. is 3,000 MPa or less, a sufficient tension can be applied in production by a roll-to-roll method, and sagging is less likely to occur, so that pictures can be printed on one top of another without being misaligned, and so-called picture registration is improved.

If necessary, one surface or both surfaces of the base material layer 3 may be subjected to physical or chemical surface treatment by an oxidation method or a surface roughening method for improving adhesion to a layer provided thereon. Examples of the oxidation method applied as surface treatment of the base material layer 3 include corona discharge treatment, chromium oxidation treatment, flame treatment, hot air treatment and ozone ultraviolet treatment methods. Examples of the surface roughening method applied as surface treatment of the base material layer 3 include a sandblasting method and a solvent treatment method. These surface treatments are appropriately selected according to the type of resin component forming the base material layer 3, and a corona discharge treatment method is preferable from the viewpoint of an effect, handling characteristics and the like.

The base material layer 3 may be subjected to treatment such as formation of a known adhesive layer.

Further, the base material layer 3 may be colored using a colorant, or is not required to be colored. In addition, the base material layer 3 may be colorless and transparent, colored and transparent, or translucent. The colorant which is used for the base material layer 3 is not particularly limited, and is preferably a colorant that is not discolored even under a temperature condition of 150° C. or higher, and specific examples thereof include existing dry colors, paste colors and masterbatch resin compositions.

The thickness of the base material layer 3 is appropriately set according to a use of the decorative sheet, a molding method for integration with a molded resin, or the like, and is normally about 25 to 1000 μm or about 50 to 700 μm. More specifically, when the decorative sheet of the present disclosure is subjected to an insert molding method, the thickness of the base material layer 3 is normally about 50 to 1000 μm, preferably about 100 to 700 μm, more preferably about 100 to 500 μm. In addition, when the decorative sheet of the present disclosure is subjected to an injection molding simultaneous decorating method, the thickness of the base material layer 3 is normally about 25 to 200 μm, preferably about 50 to 200 μm, more preferably about 70 to 200 μm.

[First Protective Layer 1]

The first protective layer 1 forms an uneven shape on the outer surface of the decorative sheet. The first protective layer 1 includes a cured product of a resin composition containing an ionizing radiation curable resin and a thermoplastic resin. In the decorative sheet of the present disclosure, the first protective layer 1 having an uneven shape is formed of a cured product of a resin composition containing an ionizing radiation curable resin and a thermoplastic resin, and the second protective layer 2 described later is provided, so that the uneven shape before molding is suitably maintained even after molding, and excellent chemical resistance can be exhibited. That is, in the decorative sheet of the present disclosure, the first protective layer 1 and the second protective layer 2 are formed of cured product of a specific resin composition in this order from the outer surface, so that both maintenance of the uneven shape and excellent chemical resistance can be achieved.

<Uneven Shape>

The uneven shape of the outer surface of the decorative sheet of the present disclosure is the uneven shape of the first protective layer 1. The uneven shape of the first protective layer 1 is not particularly limited, and may be appropriately set according to a design impression or the like to be imparted. Examples of the uneven shape include hairline pictures, wood grain pictures, and geometric pictures (e.g. dots, stripes and carbon). The second protective layer 2 described later is not required to have an uneven shape, and preferably has an uneven shape along the uneven shape of the first protective layer 1.

The height of the convex portion, the width of the convex portion, the pitch between adjacent convex portions, the width of the concave portion and the like in the uneven shape of the first protective layer 1 may be appropriately set according to a design impression to be imparted to a decorative resin molded article.

For example, the arithmetic mean roughness (Ra) of the surface (i.e. the outer surface of the decorative sheet) of the first protective layer 1 is typically 1 to 20 μm, preferably 5 to 20 μm, more preferably 10 to 20 μm for imparting an excellent design impression from the uneven shape.

In the decorative sheet of the present disclosure, the uneven shape of the first protective layer 1 may be formed in at least a part of the region for imparting a high realistic design feeling from the uneven shape to decorative sheet. That is, in the decorative sheet of the present disclosure, the uneven shape of the outer surface may be formed in a part of the region or in the entire region.

The concave portion of the uneven shape of the first protective layer 1 may reach the second protective layer 2 located below the first protective layer 1, or even, for example, the primer layer 4, the pattern layer 5 or the base material layer 3. From the viewpoint of effectively suppressing elimination, deformation or the like of the uneven shape during injection molding of the decorative sheet, it is preferable that the concave portion of the uneven shape reaches the base material layer 3.

<Composition>

The first protective layer 1 includes a cured product of a resin composition containing an ionizing radiation curable resin and a thermoplastic resin. The ratio of the ionizing radiation curable resin to the thermoplastic resin in the first protective layer 1 is preferably ionizing radiation curable resin:thermoplastic resin=10:90 to 25:75, more preferably about 15:85 to 25:75, still more preferably about 20:80 to 25:75 in terms of a mass ratio.

The thermoplastic resin is not particularly limited, and is preferably an acrylic resin, an acryl-modified polyolefin resin, a chlorinated polyolefin resin, a vinyl chloride-vinyl acetate copolymer, a thermoplastic urethane resin, a thermoplastic polyester resin, a polyamide resin, a rubber-based resin, or the like. Among them, an acrylic resin is particularly preferable from the viewpoint of achieving both maintenance of the uneven shape and excellent chemical resistance.

Examples of the acrylic resin include homopolymers of a (meth)acrylic acid ester, copolymers of two or more different (meth)acrylic acid ester monomers, and copolymers of a (meth)acrylic acid ester and another monomer, and specifically, (meth)acrylic resins composed of homopolymers or copolymers including (meth)acrylic acid esters such as polymethyl (meth)acrylate, polyethyl (meth)acrylate, polypropyl (meth)acrylate, polybutyl (meth)acrylate, methyl (meth)acrylate-butyl (meth)acrylate copolymers, ethyl (meth)acrylate-butyl (meth)acrylate copolymers, ethylene-methyl (meth)acrylate copolymers and styrene-methyl (meth)acrylate copolymers are suitably used.

The weight average molecular weight of the thermoplastic resin is not particularly limited, and is preferably about 90000 to 150000, more preferably about 100000 to 140000, still more preferably about 110000 to 130000 from the viewpoint of achieving both maintenance of the uneven shape and excellent chemical resistance.

The weight average molecular weight of the thermoplastic resin in this specification is a value obtained by performing measurement using a gel permeation chromatography method using polystyrene as a standard substance.

(Ionizing Radiation Curable Resin)

The ionizing radiation curable resin to be used for formation of the first protective layer 1 is a resin that is crosslinked and cured when irradiated with an ionizing radiation. Here, the ionizing radiation means an electromagnetic wave or charged particle ray having an energy quantum capable of polymerizing or crosslinking a molecule, and normally an ultraviolet (UV) ray or an electron beam (EB) is used, but the ionizing radiations also include electromagnetic waves such as an X-ray and a γ-ray, and charged particle rays such as an α-ray and an ion beam. Among ionizing radiation curable resins, electron beam-curable resins are suitably used in formation of a surface layer because they can be made solventless, do not require an initiator for photopolymerization, and exhibit stable curing characteristics.

Specific examples of the ionizing radiation curable resin to be used for formation of the first protective layer include those in which at prepolymers, oligomers and monomers each having a polymerizable unsaturated bond or an epoxy group in the molecule are appropriately mixed.

As the oligomer to be used as an ionizing radiation curable resin, (meth)acrylate oligomers having a radical-polymerizable unsaturated group in the molecule are suitable, and among them, polyfunctional (meth)acrylate oligomers having two or more polymerizable unsaturated bonds in the molecule (di- or -more functional) are preferable. Examples of the polyfunctional (meth)acrylate oligomer include polycarbonate (meth)acrylate, acrylic silicone (meth)acrylate, urethane (meth)acrylate, epoxy (meth) acrylate, polyester (meth)acrylate, polyether (meth)acrylate, polybutadiene (meth)acrylate, silicone (meth)acrylate, silicone-modified urethane (meth)acrylate and oligomers having a cation-polymerizable functional group in the molecule (e.g. novolac-type epoxy resins, bisphenol-type epoxy resins, aliphatic vinyl ethers, aromatic vinyl ethers and so on). Here, the polycarbonate (meth)acrylate is not particularly limited as long as it has a carbonate bond on the polymer main chain, and has a (meth)acrylate group at the end or side chain, and the polycarbonate (meth)acrylate can be obtained by esterifying a polycarbonate polyol with (meth)acrylic acid. The polycarbonate (meth)acrylate may be, for example, urethane (meth)acrylate having a polycarbonate backbone. The urethane (meth)acrylate having a polycarbonate backbone is obtained by, for example, reacting a polycarbonate polyol, a polyvalent isocyanate compound and hydroxy (meth)acrylate. The acrylic silicone (meth) acrylate can be obtained by radical-copolymerizing a silicone macro-monomer with a (meth)acrylate monomer. The urethane (meth)acrylate can be obtained by, for example, esterifying a polyurethane oligomer with (meth)acrylic acid, the polyurethane oligomer being obtained by reaction of a polyether polyol or a polyester polyol with a polyisocyanate. The epoxy (meth)acrylate can be obtained by, for example, reacting (meth)acrylic acid with an oxirane ring of a relatively low-molecular-weight bisphenol-type epoxy resin or novolac-type epoxy resin to perform esterification. Carboxyl-modified epoxy (meth)acrylate obtained by partially modifying the epoxy (meth)acrylate with a dibasic carboxylic anhydride can also be used. For example, the polyester (meth)acrylate can be obtained by esterifying hydroxyl groups of a polyester oligomer with (meth)acrylic acid, the polyester oligomer being obtained by condensation of a polyvalent carboxylic acid and a polyhydric alcohol and having a hydroxyl group at each of both ends, or by esterifying a hydroxyl group at the end of an oligomer with (meth)acrylic acid, the oligomer being obtained by adding an alkylene oxide to a polyvalent carboxylic acid. The polyether (meth)acrylate can be obtained by esterifying a hydroxyl group of a polyether polyol with (meth)acrylic acid. The polybutadiene (meth)acrylate can be obtained by adding (meth)acrylic acid to the side chain of a polybutadiene oligomer. The silicone (meth)acrylate can be obtained by adding (meth)acrylic acid to the end or side chain of a silicone having a polysiloxane bond in the main chain. The silicone-modified urethane (meth)acrylate is obtained by, for example, reacting a urethane prepolymer having an isocyanate group with a silicone compound having a silanol group together with hydroxy (meth)acrylate. These oligomers may be used alone, or may be used in combination of two or more thereof.

As the monomer to be used as an ionizing radiation curable resin, (meth)acrylate monomers having a radical-polymerizable unsaturated group in the molecule are suitable, and among them, polyfunctional (meth)acrylate monomers are preferable. The polyfunctional (meth)acrylate monomer may be a (meth)acrylate monomer having two or more polymerizable unsaturated bonds in the molecule. Specific examples of the polyfunctional (meth)acrylate monomer include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, ethylene oxide-modified bisphenol A di(meth)acrylate, ethylene oxide-modified trimethylolpropane tri(meth)acrylate, dipentaerythritol tri(meth) acrylate, propionic acid-modified dipentaerythritol tri(meth) acrylate, pentaerythritol tri(meth)acrylate, propylene oxide-modified trimethylolpropane tri(meth)acrylate, tris (acryloxyethyl)isocyanurate, propionic acid-modified dipentaerythritol penta(meth)acrylate, dipentaerythritol hexa(meth)acrylate, ethylene oxide-modified dipentaerythritol hexa(meth)acrylate and caprolactone-modified dipentaerythritol hexa(meth)acrylate. These monomers may be used alone, or may be used in combination of two or more thereof.

For these ionizing radiation curable resins, the number of functional groups of the monomer contained in the ionizing radiation curable resin is preferably in the range of 2 to 6, more preferably in the range of 2 to 4, from the viewpoint of achieving both maintenance of the uneven shape and excellent chemical resistance. The molecular weight of the monomer contained in the ionizing radiation curable resin is preferably about 200 to 2000, more preferably about 200 to 1500, further preferably about 200 to 1000.

Further, among these monomers, dipentaerythritol tri (meth)acrylate, pentaerythritol tri(meth)acrylate, trimethylolpropane tri(meth)acrylate, ethylene oxide-modified trimethylolpropane tri(meth)acrylate, ethylene oxide-modified bisphenol A di(meth)acrylate, and the like are particularly preferable.

<Other Additives>

According to desired properties to be imparted to the first protective layer 1, various additives can be blended in the resin composition to be used for formation of the first protective layer 1. Examples of the additives include weather resistance improving agents such as ultraviolet absorbents and light stabilizers, abrasion resistance improvers, polymerization inhibitors, crosslinkers, infrared absorbers, antistatic agents, bondability improvers, leveling agents, thixotropy imparting agents, coupling agents, plasticizers, antifoaming agents, fillers, solvents, colorants and wax. These additives can be appropriately selected from those that are commonly used. As the ultraviolet absorbent and light stabilizer, a reactive ultraviolet absorbent and light stabilizer having a polymerizable group such as a (meth) acryloyl group in the molecule can also be used. By blending wax, scratch resistance and abrasion resistance can be improved. The wax is preferably olefin wax such as polyethylene wax (PE wax). When the wax is blended, the amount of the wax blended in the curable resin composition is preferably about 0.1 to 5 mass %, more preferably about 0.5 to 3 mass %.

The first protective layer 1 may contain a matting agent. The matting agent is not particularly limited, and examples thereof include inorganic particles and synthetic resin particles.

Examples of the inorganic particles that are preferable include particles of silica, alumina, calcium carbonate, magnesium carbonate, calcium sulfate, barium sulfate, kaolin, and hydrophobic-treated products thereof. These inorganic particles may be used alone, or may be used in combination of two or more thereof. Examples of the synthetic resin particles that are preferable include acrylic beads, urethane beads, nylon beads, silicone beads, silicone rubber beads, polycarbonate beads, and polyolefin wax (e.g. polypropylene wax, polyethylene wax and mixtures thereof). Of these types of synthetic resin particles, one type of resin particles may be used alone, or two or more types of resin particles may be used in combination.

The first protective layer 1 may contain inorganic particles or synthetic resin particles, or contain inorganic particles and synthetic resin particles in combination. The average particle size of the inorganic particles and the synthetic resin particles is preferably 0.1 to 5 μm, more preferably 1 to 5 μm, still more preferably 2 to 5 μm from the viewpoint of improving designability. The particle sizes of the inorganic particles and the synthetic resin particles are measured by an injection-type dry measurement method in which powder to be measured is injected from a nozzle by means of compressed air, and dispersed in the air to perform measurement using a laser diffraction-type particle size distribution measurement apparatus (SALD-2100-WJA1 manufactured by Shimadzu Corporation).

From the viewpoint of more suitably maintaining the uneven shape of the decorative sheet according to the second embodiment, the tensile elastic modulus of the first protective layer 1 at 23° C. is preferably about 600 MPa or more, more preferably about 800 MPa or more, still more preferably about 1000 MPa or more, even more preferably about 1200 MPa or more. The tensile elastic modulus is preferably about 2500 MPa or less, more preferably about 2000 MPa or less. The tensile elastic modulus is preferably in the range of about 600 to 2000 MPa, about 600 to 1500 MPa, about 800 to 2000 MPa, about 800 to 1500 MPa, about 1000 to 2000 MPa, about 1000 to 1500 MPa, about 1200 to 2000 MPa, or about 1200 to 1500 MPa.

From the viewpoint of more suitably maintaining the uneven shape of the decorative sheet according to the second embodiment, the tensile elastic modulus of the first protective layer 1 at 150° C. is preferably about 10 MPa or more, more preferably about 20 MPa or more, still more preferably about 30 MPa or more. The tensile elastic modulus is preferably about 500 MPa or less, more preferably about 100 MPa or less, still more preferably about 50 MPa or less. The tensile elastic modulus is preferably in the range of about 10 to 500 MPa, about 10 to 100 MPa, about 10 to 50 MPa, about 20 to 500 MPa, about 20 to 100 MPa, about 20 to 50 MPa, about 30 to 500 MPa, about 30 to 100 MPa, or about 30 to 50 MPa.

In the second embodiment, the method for measuring the tensile elastic modulus of the first protective layer 1 at 23° C. or 150° C. is as follows. The first protective layer 1 is prepared with a thickness of 30 μm, and taken as a test sample having a width of 25 mm and a length of 80 mm. Using a Tensilon versatile material tester (Tensilon Versatile Material Tester RTC-1250A manufactured by ORIENTEC CORPORATION), the tensile elastic modulus of the test sample is measured under conditions of a chuck-to-chuck distance of 50 mm and a tension speed of 1000 mm/min in an environment at 23° C. or 150° C.

<Thickness of First Protective Layer 1>

The thickness of the first protective layer 1 after curing is not particularly limited, and is preferably 0.01 to 20 μm, more preferably 0.1 to 15 μm, still more preferably 1 to 12 μm, from both maintenance of the uneven shape and excellent chemical resistance. The thickness of the first protective layer 1 means the thickness of the convex portion of the first protective layer 1.

<Formation of First Protective Layer 1>

The first protective layer 1 may be formed on the second protective layer 2 in such a manner that the cured product of the curable resin composition has an uneven shape, and the specific method thereof is not particularly limited. Examples of the method for imparting an uneven shape to the first protective layer 1 include a method in which embossing is performed. From the viewpoint of imparting a fine uneven shape, a method in which embossing is performed is preferable (e.g. a first method or a second method described later).

Specific examples of the preferred method for forming the first protective layer 1 having an uneven shape include the following first method and second method.

First method: a sheet including a base material layer 3 and the like is provided, embossing is performed on sheet on a side where the first protective layer 1 and the second protective layer 2 are laminated, a resin composition to be used for formation of the second protective layer 2 is then applied, a resin composition to be used for formation of the first protective layer 1 is applied thereto from above, and these two resin compositions are cured one by one or at the same time.

Second method: a sheet including a base material layer 3 and the like is provided, a resin composition to be used for formation of the second protective layer 2 is applied to the sheet on a side where the first protective layer 1 and the second protective layer 2 are laminated, a resin composition to be used for formation of the first protective layer 1 is applied thereto from above, and these resin compositions are cured, and embossing is then performed on the first protective layer 1 side.

The method for applying the resin composition to be used for formation of the first protective layer 1 is not particularly limited, and examples thereof in the case of the first method or the second method include gravure coating, bar coating, roll coating, reverse roll coating, and comma coating, with gravure coating being preferable.

The resin composition (uncured resin layer) applied in this manner is irradiated with an ionizing radiation such as an electron beam or an ultraviolet ray to cure the resin composition, thereby forming the first protective layer 1.

Here, when an electron beam is used as the ionizing radiation, an accelerating voltage thereof can be appropriately selected according to a resin used and a thickness of the layer, and the accelerating voltage is normally about 70 to 300 kV.

In irradiation of an electron beam, the transmission capacity increases as the accelerating voltage becomes higher. When the first protective layer and the second protective layer 2 are cured at the same time, it is preferable to select an acceleration voltage so that the transmission depth of the electron beam is substantially equal to the total thickness of the first protective layer 1 and the second protective layer 2. When a base material that is degraded by an electron beam is used as a layer provided on a surface of the second protective layer on a side opposite to the first protective layer e.g. base material layer), an acceleration voltage is selected so that the transmission depth of the electron beam is substantially equal to the total thickness of the first protective layer 1 and the second protective layer 2. This enables suppression of irradiation of the lower layer with an excess electron beam, so that degradation of the lower layer by an excessive electron beam can be minimized.

The amount of radiation is preferably an amount with which the crosslinking density of the resin layer is saturated, and the amount of radiation is selected within a range of normally 5 to 300 kGy (0.5 to 30 Mrad), preferably 10 to 50 kGy (1 to 5 Mrad).

Further, the electron beam source is not particularly limited, and various kinds of electron beam accelerators can be used such as, for example, those of Cockcroft-Walton type, van de graaff type, tuned transformer type, insulated core transformer type, linear type, dynamitron type and high frequency type.

When an ultraviolet ray is used as the ionizing radiation, it is practical to radiate light including an ultraviolet ray having a wavelength of 190 to 380 nm. The ultraviolet ray source is not particularly limited, and examples thereof include high-pressure mercury lamps, low-pressure mercury lamps, metal halide lamps and carbon arc lamps.

[Second Protective Layer 2]

The second protective layer 2 is located below the first protective layer 1 (on a side opposite to the outside). In the first embodiment, the second protective layer is formed of a cured product of an ionizing radiation curable resin composition containing polycarbonate (meth)acrylate. As described above, in the decorative sheet according to the first embodiment, the first protective layer 1 forming the outer uneven shape is a cured product of a resin composition containing an ionizing radiation curable resin and a thermoplastic resin, and the second protective layer 2 is a cured product of an ionizing radiation curable resin composition containing polycarbonate (meth)acrylate, so that it is possible to suitably achieve both maintenance of the uneven shape and excellent chemical resistance.

On the other hand, in the second embodiment, the second protective layer is formed of a cured product of an ionizing radiation curable resin composition. As described above, in the decorative sheet according to the second embodiment, the first protective layer 1 forming the outer uneven shape is a cured product of a resin composition containing an ionizing radiation curable resin and a thermoplastic resin, the tensile elastic modulus of the second protective layer 2 at 23° C. is 500 MPa or less, and the second protective layer 2 has no thermal softening point at 200° C. or lower, so that it is possible to suitably achieve both maintenance of the uneven shape and excellent chemical resistance.

In the second embodiment, the tensile elastic modulus of the second protective layer 2 at 23° C. is preferably about 450 MPa or less, more preferably about 400 MPa or less, still more preferably about 300 MPa or less, even more preferably about 250 MPa or less, from the viewpoint of more suitably maintaining the uneven shape of the decorative sheet. The tensile elastic modulus is preferably about 30 MPa or more, more preferably about 50 MPa or more. The tensile elastic modulus is preferably in the range of about 30 to 500 MPa, about 30 to 450 MPa, about 30 to 400 MPa, about 30 to 300 MPa, about 30 to 250 MPa, about 50 to 500 MPa, about 50 to 450 MPa, about 50 to 400 MPa, about 50 to 300 MPa, or about 50 to 250 MPa.

In the second embodiment, the method for measuring the tensile elastic modulus of the second protective layer 2 at 23° C. is as follows. The second protective layer 2 is prepared with a thickness of 30 μm, and taken as a test sample having a width of 25 mm and a length of 80 mm. Using a Tensilon versatile material tester (Tensilon Versatile Material Tester RTC-1250A manufactured by ORIENTEC CORPORATION), the tensile elastic modulus of the test sample was measured under conditions of a chuck-to-chuck distance of 50 mm and a tension speed of 1000 mm/min in an environment at 23° C.

In the second embodiment, the method for measuring the thermal softening point of the second protective layer 2 is as follows. The second protective layer 2 is prepared with a thickness of 30 μm, and taken as a test sample having a width of 25 mm and a length of 80 mm. Using a thermal analyzer (TMA), the temperature is elevated from room temperature (25° C.) to 200° C. at a temperature elevation rate of 5° C./min to examine whether or not the test sample had a thermal softening point. The start temperature is set to 25° C. because it is not considered that a thermal softening point is present at a temperature of 25° C. or lower.

In the second embodiment, the ionizing radiation curable resin used for the second protective layer 2 is not particularly limited as long as the tensile elastic modulus of the second protective layer 2 at 23° C. is 500 MPa or less, and a thermal softening point is not present at 200° C. or lower, and for example, the ionizing radiation curable resin exemplified for the first protective layer 1 can be used. From the viewpoint of imparting such characteristics to the second protective layer 2, it is preferable that the ionizing radiation curable resin composition forming the second protective layer 2 contains polycarbonate (meth)acrylate as the ionizing radiation curable resin.

It is preferable that the second protective layer 2 has an uneven shape along the uneven shape of the first protective layer 1. Details of the uneven shape of the first protective layer 1 are as described above.

As described above, the polycarbonate (meth)acrylate to be used for the second protective layer 2 has a carbonate bond on the polymer main chain and a (meth)acrylate group at the terminal or on the side chain. For example, the polycarbonate (meth)acrylate can be obtained by esterifying a polycarbonate polyol with (meth)acrylic acid. The (meth) acrylate is preferably di-or-more-functional from the viewpoint of crosslinking and curing. The polycarbonate (meth) acrylate may be, for example, urethane (meth)acrylate having a polycarbonate backbone. The urethane (meth) acrylate having a polycarbonate backbone is obtained by, for example, reacting a polycarbonate polyol, a polyvalent isocyanate compound and hydroxy (meth)acrylate.

The polycarbonate (meth)acrylate is obtained by, for example, converting some or all of hydroxyl groups of a polycarbonate polyol into a (meth)acrylate (acrylic acid ester or methacrylic acid ester). The esterification reaction can be carried out by a usual esterification reaction. Examples thereof include 1) a method in which a polycarbonate polyol and an acrylic acid halide or methacrylic acid halide are condensed in the presence of a base; 2) a method in which a polycarbonate polyol and an acrylic anhydride or methacrylic anhydride are condensed in the presence of a catalyst; and 3) a method in which a polycarbonate polyol and an acrylic acid or methacrylic acid are condensed in the presence of an acid catalyst.

The polycarbonate polyol is a polymer having a carbonate bond in the polymer main chain, and having 2 or more, preferably 2 to 50, more preferably 3 to 50 hydroxyl groups at the end or side chain. A typical method for producing the polycarbonate polyol is a method using a polycondensation reaction of a diol compound (A), a polyhydric alcohol (B) of tri- or more valence, and a compound (C) as a carbonyl component. The diol compound (A) which is used as a raw material is represented by the general formula HO—$R^1$—OH. Here, $R^1$ is a divalent hydrocarbon with a carbon number of 2 to 20, and may include an ether bond in the group. $R^1$ is, for example, a linear or branched alkylene group, a cyclohexylene group or a phenylene group.

Specific examples of the diol compound include ethylene glycol, 1,2-propylene glycol, diethylene glycol, dipropylene glycol, triethylene glycol, polyethylene glycol, neopentyl glycol, 1,3-propanediol, 1,4-butanediol, 1,5-pentanediol, 3-methyl-1,5-pentanediol, 1,6-hexanediol, 1,8-octanediol, 1,3-bis(2-hydroxyethoxy)benzene, 1,4-bis(2-hydroxyethoxy)benzene, 1,4-cyclohexanediol and 1,4-cyclohexanedimethanol. These diols may be used alone, or may be used in combination of two or more thereof.

Examples of the polyhydric alcohol (B) of tri- or more valence may include alcohols such as trimethylolpropane, trimethylolethane, pentaerythritol, ditrimethylolpropane, dipentaerythritol, glycerin and sorbitol. The polyhydric alcohol may be an alcohol having a hydroxyl group with 1 to 5 equivalents of ethylene oxide, propylene oxide or other alkylene oxide added to the hydroxyl group of the polyhydric alcohol. These polyhydric alcohols may be used alone, or may be used in combination of two or more thereof.

The compound (C) as a carbonyl component is any compound selected from a carbonic acid diester, phosgene and an equivalent thereof. Specific examples of the compound include carbonic acid diesters such as dimethyl carbonate, diethyl carbonate, diisopropyl carbonate, diphenyl carbonate, ethylene carbonate and propylene carbonate; phosgene; halogenated formic acid esters such as methyl chloroformate, ethyl chloroformate and phenyl chloroformate. These compounds may be used alone, or may be used in combination of two or more thereof.

The polycarbonate polyol is synthesized subjecting a diol compound (A), a polyhydric alcohol (B) of tri- or more valence, and a compound (C) as a carbonyl component to a polycondensation reaction under general conditions. For example, the charged molar ratio of the diol compound (A) and the polyhydric alcohol (B) is preferably in the range of 50:50 to 99:1, and the charged molar ratio of the compound (C) as a carbonyl component to the diol compound (A) and the polyhydric alcohol (B) is preferably 0.2 to 2 to hydroxyl groups of the diol compound and the polyhydric alcohol.

The equivalent number (eq./mol) of hydroxyl groups existing in the polycarbonate polyol after the polycondensation reaction with the above-mentioned charged ratio is 3 or more, preferably 3 to 50, more preferably 3 to 20 on average in one molecule. When the equivalent number is in a range as described above, a necessary amount of (meth) acrylate groups are formed through an esterification reaction as described later, and moderate flexibility is imparted to the polycarbonate (meth)acrylate resin. The terminal functional groups of the polycarbonate polyol are usually OH groups, but some of them may be carbonate groups.

The method for producing a polycarbonate polyol as described above is described in, for example, Japanese Patent Laid-open Publication No. S64-1726. The polycarbonate polyol can also be produced through an ester exchange reaction of a polycarbonate diol and a polyhydric alcohol of tri- or more valence as described in Japanese Patent Laid-Open Publication No. 1103-181517.

The molecular weight of the polycarbonate (meth)acrylate for use in the present disclosure is preferably 500 or more, more preferably 1,000 or more, still more preferably 2,000 or more in terms of a weight average molecular weight measured by gel permeation chromatography (GPC) analysis and calculated in terms of standard polystyrene. The upper limit of the weight average molecular weight of the polycarbonate (meth)acrylate is not particularly limited, but it is preferably 100,000 or less, more preferably 50,000 or less for controlling the viscosity so as not to be excessively high. The content is more preferably 2,000 or more and 50,000 or less, particularly preferably 5,000 to 20,000 because both maintenance of the uneven shape and excellent chemical resistance are suitably achieved in the decorative sheet of the present disclosure.

It is preferable that in the ionizing radiation curable resin composition of the second protective layer, the polycarbonate (meth)acrylate be used together with a polyfunctional (meth)acrylate. In other words, it is preferable that the ionizing radiation curable resin composition further contain a polyfunctional (meth)acrylate. The mass ratio of the polycarbonate (meth)acrylate and the polyfunctional (meth)acrylate is more preferably 98:2 to 50:50 (polycarbonate (meth) acrylate:polyfunctional (meth)acrylate). When the mass ratio of the polycarbonate (meth)acrylate and the polyfunctional (meth)acrylate is less than 98:2 (i.e. the amount of the polycarbonate (meth)acrylate is 98% by mass or less based on the total amount of the two components), chemical resistance is further improved. On the other hand, when the mass ratio of the polycarbonate (meth)acrylate and the polyfunctional (meth)acrylate is more than 50:50 (i.e. the amount of the polycarbonate (meth)acrylate is 50% by mass or more based on the total amount of the two components), three-dimensional moldability is further improved. The mass ratio of the polycarbonate (meth)acrylate and the polyfunctional (meth)acrylate is preferably 95:5 to 60:40.

The polyfunctional (meth)acrylate for use in the present disclosure is not particularly limited as long as it is a di-or-more-functional (meth)acrylate. The polyfunctional (meth)acrylate is preferably a tri-or-more-functional (meth) acrylate from the viewpoint of curability. Here, the term "difunctional" means that two ethylenically unsaturated bonds {(meth)acryloyl groups} exist in the molecule.

The polyfunctional (meth)acrylate may be either an oligomer or a monomer, but it is preferably a polyfunctional (meth)acrylate oligomer for improving three-dimensional moldability.

Examples of the polyfunctional (meth)acrylate oligomer include urethane (meth)acrylate-based oligomers, epoxy (meth)acrylate-based oligomers, polyester (meth)acrylate-based oligomers and polyether (meth)acrylate-based oligomers. Here, the urethane (meth)acrylate-based oligomer can be obtained by, for example, esterifying a polyurethane oligomer with (meth)acrylic acid, the polyurethane oligomer being obtained by reaction of a polyether polyol or a polyester polyol with a polyisocyanate. The epoxy (meth) acrylate-based oligomer can be obtained by, for example, reacting (meth)acrylic acid with an oxirane ring of a relatively low-molecular-weight bisphenol-type epoxy resin or novolac-type epoxy resin to perform esterification. A carboxyl-modified epoxy (meth)acrylate oligomer obtained by partially modifying the epoxy (meth)acrylate-based oligomer with a dibasic carboxylic anhydride can also be used. For example, the polyester (meth)acrylate-based oligomer can be obtained by esterifying hydroxyl groups of a polyester oligomer with (meth)acrylic acid, the polyester oligomer being obtained by condensation of a polyvalent carboxylic acid and a polyhydric alcohol and having a hydroxyl group at each of both ends, or by esterifying a hydroxyl group at the end of an oligomer with (meth)acrylic acid, the oligomer being obtained by adding an alkylene oxide to a polyvalent carboxylic acid. The polyether (meth) acrylate-based oligomer can be obtained by esterifying a hydroxyl group of a polyether polyol with (meth)acrylic acid.

Further, other polyfunctional (meth)acrylate oligomers include highly hydrophobic polybutadiene (meth)acrylate-based oligomers having a (meth)acrylate group on the side chain of a polybutadiene oligomer, silicone (meth)acrylate-based oligomers having a polysiloxane bond on the main chain, and aminoplast resin (meth)acrylate-based oligomers obtained by modifying an aminoplast resin having many reactive groups in a small molecule.

Specific examples of the polyfunctional (meth)acrylate monomer include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth) acrylate, propionic acid-modified dipentaerythritol tri(meth) acrylate, pentaerythritol tri(meth)acrylate, propylene oxide-modified trimethylolpropane tri(meth)acrylate, tris (acryloxyethyl)isocyanurate, propionic acid-modified dipentaerythritol penta(meth)acrylate, dipentaerythritol hexa(meth)acrylate, ethylene oxide-modified dipentaerythritol hexa(meth)acrylate and caprolactone-modified dipentaerythritol hexa(meth)acrylate. The polyfunctional (meth) acrylate oligomers and polyfunctional (meth)acrylate monomers described above may be used alone, or may be used in combination of two or more thereof.

In the present disclosure, for the purpose of, for example, reducing the viscosity of the polyfunctional (meth)acrylate, a monofunctional (meth)acrylate can be appropriately used in combination with the polyfunctional (meth)acrylate within the bounds of not hindering the purpose of the present disclosure. Examples of the monofunctional (meth)acrylate include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth) acrylate and isobornyl (meth)acrylate. These monofunctional (meth)acrylates may be used alone, or may be used in combination of two or more thereof.

The content (solid content) of the polycarbonate (meth) acrylate in the ionizing radiation curable resin composition forming the second protective layer 2 is not particularly limited, and is preferably about 50 to 100 mass %, more preferably about 65 to 100 mass %, for suitably achieving both maintenance of the uneven shape and excellent chemical resistance in the decorative sheet of the present disclosure.

<Other Additives>

According to desired properties to be imparted to the second protective layer 2, various additives can be blended in the resin composition to be used for formation of the second protective layer 2. As the additives, the same additives as those exemplified for the first protective layer 1 are exemplified, and the same applies to the amounts of the additives blended.

<Thickness of Second Protective Layer 2>

The thickness of the second protective layer 2 after curing is not particularly limited, and is preferably 0.01 to 20 μm, more preferably 12 to 20 μm, still more preferably 15 to 20 μm, from both maintenance of the uneven shape and excellent chemical resistance. When the second protective layer 2 has an uneven shape, the thickness of the second protective layer 2 means the thickness of the convex portion of the second protective layer 2.

<Method for Forming Second Protective Layer 2>

The second protective layer 2 may be formed in such a manner that a cured product of the curable resin composition is formed, and the specific method thereof is not particularly limited. The second protective layer 2 can be suitably formed by the method exemplified for the method for forming the first protective layer 1 (e.g. the first method or the second method described above).

Examples of the method for applying the resin composition to be used for formation of the second protective layer 2 include the same methods as those for the first protective layer 1. The method for forming the second protective layer 2 by irradiating the applied resin composition (uncured resin layer of the second protective layer 2) with an ionizing radiation such as an electron beam or an ultraviolet ray to cure the resin composition is the same as that for the first protective layer 1. It is preferable to cure the first protective layer and the second protective layer 2 at the same time as described above.

[Primer Layer 4]

If necessary, the primer layer 4 can be provided on a surface of the second protective layer on a side opposite to the first protective layer for the purpose of, for example, improving adhesion of the second protective layer 2. The primer layer 4 is a layer which is provided if necessary between the base material layer 3 and the second protective layer 2 when the base material layer 3 is provided, or between the pattern layer 5 and the second protective layer 2 and/or between the base material layer 3 and the pattern layer 5 when the pattern layer 5 is provided.

From the viewpoint of improving adhesion between the second protective layer 2 and a layer located on a surface on a side opposite to the first protective layer, it is preferable that the primer layer 4 is provided immediately below the second protective layer 2.

As the primer composition that forms the primer layer 4, those having a urethane resin, a (meth)acrylic resin, a (meth)acryl-urethane copolymer resin, a vinyl chloride-vinyl acetate copolymer, a polyester resin, a butyral resin, chlorinated polypropylene, chlorinated polyethylene or the like as a binder resin are preferably used, and these resins can be used alone or in combination of two or more thereof. Among them, urethane resins, (meth)acrylic resins and (meth)acrylic-urethane copolymer resins are preferable.

As the urethane resin, a polyurethane having a polyol (polyhydric alcohol) as a main component and an isocyanate as a crosslinker (curing agent) can be used. The polyol has two or more hydroxyl groups in the molecule, and examples thereof include polyester polyol, polyethylene glycol, polypropylene glycol, acrylic polyol and polyether polyol. Examples of the isocyanate include polyvalent isocyanates having two or more isocyanate groups in the molecule; aromatic isocyanates such as 4,4-diphenylmethane diisocyanate; and aliphatic (or alicyclic) isocyanates such as hexamethylene diisocyanate, isophorone diisocyanate, hydrogenated tolylene diisocyanate and hydrogenated diphenylmethane diisocyanate. It is also possible to mix a urethane resin and a butyral resin.

From the viewpoint of adhesion with the second protective layer 2, unlikeliness of interaction after lamination of the second protective layer 2, physical properties and moldability, it is preferable to combine an acrylic polyol or a polyester polyol as a polyol with hexamethylene diisocyanate or 4,4-diphenylmethane diisocyanate as a crosslinker, and it is particularly preferable to use an acrylic polyol and hexamethylene diisocyanate in combination.

Examples of the (meth)acrylic resin include homopolymers of a (meth)acrylic acid ester, copolymers of two or more different (meth)acrylic acid ester monomers, and copolymers of a (meth)acrylic acid ester and another monomer, and specifically, (meth)acrylic resins composed of homopolymers or copolymers including (meth)acrylic acid esters such as polymethyl (meth)acrylate, polyethyl (meth)acrylate, polypropyl (meth)acrylate, polybutyl (meth)acrylate, methyl (meth)acrylate-butyl (meth)acrylate copolymers, ethyl (meth)acrylate-butyl (meth)acrylate copolymers, ethylene-methyl (meth)acrylate copolymers and styrene-methyl (meth)acrylate copolymers are suitably used.

As the (meth)acrylic-urethane copolymer resin, for example, an acryl-urethane (polyester urethane) block copolymer-based resin is preferable. As the curing agent, the above-described various isocyanates are used. It is preferable that in the acryl-urethane (polyester urethane) block copolymer-based resin, the acrylic/urethane ratio (mass ratio) is adjusted within the range of preferably 9/1 to 1/9, more preferably 8/2 to 2/8, as desired.

The thickness of the primer layer 4 is not particularly limited, and is, for example, about 0.5 to 20 μm, preferably 1 to 5 μm.

The primer layer 4 is formed by a normal coating method such as gravure coating, gravure reverse coating, gravure offset coating, spinner coating, roll coating, reverse roll coating, kiss coating, wheeler coating, dip coating, solid coating with a silk screen, wire bar coating, flow coating, comma coating, pour coating, blushing or spray coating, or a transfer coating method using a primer composition. Here, the transfer coating method is a method in which a coating film of a primer layer or adhesive layer is formed on a thin sheet (film base material), and thereafter the surface of the intended layer in the decorative sheet is coated with the coating film

[Pattern Layer 5]

The pattern layer 5 is a layer which is provided on a surface of the second protective layer on a side opposite to the first protective layer if necessary for the purpose of imparting decorativeness to the decorative sheet. The pattern layer 5 is a layer which is provided if necessary between the base material layer 3 and the second protective layer 2 when the base material layer 3 is provided, between the base material layer 3 and the primer layer 4 when the primer layer 4 is provided, or between the masking layer and the second protective layer 2 when the masking layer is provided.

The pattern layer 5 can be, for example, a layer in which a desired picture is formed using an ink composition. As the ink composition which is used for forming the pattern layer 5, one obtained by appropriately mixing a binder with a colorant such as a pigment or a dye, an extender pigment, a solvent, a stabilizer, a plasticizer, a catalyst, a curing agent and the like is used.

The binder which is used for the ink composition is not particularly limited, and examples thereof include polyurethane resins, vinyl chloride/vinyl acetate copolymer resins, vinyl chloride/vinyl acetate/acrylic copolymer resins, chlorinated polypropylene resins, acrylic resins, polyester resins, polyamide resins, butyral resins, polystyrene resins, nitrocellulose resins and cellulose acetate resins. These binders may be used alone, or may be used in combination of two or more thereof.

The colorant which is used for the ink composition is not particularly limited, and examples thereof include inorganic pigments such as carbon black (black), iron black, titanium white, antimony white, yellow lead, titanium yellow, rouge, cadmium red, ultramarine and cobalt blue; organic pigments or dyes such as quinacridone red, isoindolinone yellow and phthalocyanine blue; metallic pigments composed of scaly foil pieces of aluminum, brass or the like; and pearlescent (pearl) pigments composed of scaly foil pieces of titanium dioxide-coated mica, basic lead carbonate or the like.

The picture formed by the pattern layer 5 is not particularly limited, and examples thereof include woody texture patterns, grainy patterns imitating the surface of rock, such as marble patterns (e.g. travertine marble patterns), fabric patterns imitating grains of fabric or cloth-like patterns, tiling patterns, and brick masonry patterns, and the pattern may be a pattern of a wooden mosaic, a patchwork or the like obtained by combining the above-mentioned patterns, or may be a monochromatic plain pattern (so-called full solid pattern). These pictures are formed by multicolor printing with normal process colors of yellow, red, blue and black, and can also be formed by, for example, multicolor printing with a spot color, which is performed with the preparation of plates of individual colors for forming the pattern.

The thickness of the pattern layer is not particularly limited, and is, for example, 1 to 30 μm, preferably 1 to 20 μm.

The pattern layer 5 may be a thin metal film layer. Examples of the metal for forming the thin metal film layer include tin, indium, chromium, aluminum, nickel, copper, silver, gold, platinum, zinc and an alloy containing at least one of these metals. The method for forming a thin metal film layer is not particularly limited, and examples thereof include a vapor deposition method such as a vacuum vapor deposition method, a sputtering method and an ion plating method each using the above-mentioned metal. The thin metal film layer may be provided on the entire surface, or partially provided. For improving adhesion with the adjacent layer, the surface or back surface of the thin metal film layer may be provided with a primer layer using a known resin.

[Masking Layer]

The masking layer is a layer which is provided if necessary between the base material layer 3 and the second protective layer 2, between the base material layer 3 and the primer layer 4 when the primer layer 4 is provided, or between the base material layer 3 and the pattern layer 5 when the pattern layer 5 is provided, for the purpose of suppressing a change or variation in color of the base material layer 3.

The masking layer is provided for inhibiting the base material layer from adversely affecting the color tone and the picture of the decorative sheet, and therefore is generally formed as an opaque layer.

The masking layer is formed using an ink composition obtained by appropriately mixing a binder with a colorant such as a pigment or a dye, an extender pigment, a solvent, a stabilizer, a plasticizer, a catalyst, a curing agent and the like. The ink composition that forms the masking layer is appropriately selected from those used for the above-described pattern layer and used.

It is desirable that the masking layer be normally set to have a thickness of about 1 to 20 μm, and formed as a so-called solid print layer.

The masking layer may be formed by a normal printing method such as gravure printing, offset printing, silk screen printing, printing by transfer from a transfer sheet, or inkjet printing; a normal coating method such as gravure coating, gravure reverse coating, gravure offset coating, spinner coating, roll coating or reverse roll coating; or the like.

[Transparent Resin Layer]

The transparent resin layer is a layer which is provided if necessary between the base material layer 3 and the second protective layer 2, between the base material layer 3 and the primer layer 4 when the primer layer 4 is provided, between the pattern layer 5 and the second protective layer 2 when the pattern layer 5 is provided, or between the primer layer 4 and the pattern layer 5, etc. when the primer layer 4 and the pattern layer 5 are provided in this order on the base material layer 3, for the purpose of improving chemical resistance and abrasion resistance. The transparent resin layer is a layer which is suitably provided on a decorative sheet integrated with a molded resin by an insert molding method.

The resin component that forms the transparent resin layer is appropriately selected according to transparency, three-dimensional moldability, shape stability, chemical resistance and the like, and typically, a thermoplastic resin is used. The thermoplastic resin is not particularly limited, and for example, acrylic resins, polyolefin resins such as polypropylene and polyethylene, polycarbonate resins, ABS resins, polyester resins such as polyethylene terephthalate (PET) and polyethylene naphthalate (PEN), vinyl chloride resins, and the like are used. Among these thermoplastic resins, acrylic resins, polyolefin resins, polycarbonate resins and polyester resins are preferable, acrylic resins and polyester resins are more preferable, and polyester resins are still more preferable, from the viewpoint of improving chemical resistance, abrasion resistance and the like.

If necessary, one surface or both surfaces of the transparent resin layer may be subjected to physical or chemical surface treatment by an oxidation method or a surface roughening method for improving adhesion to adjacent other layers. The physical or chemical surface treatment is the same as the surface treatment applied to the base material layer.

The thickness of the transparent resin layer is not particularly limited, and is, for example, 10 to 200 μm, preferably 15 to 150 μm.

The transparent resin layer may be laminated using an adhesive, or may be directly laminated without using an adhesive. When the transparent resin layer is laminated using an adhesive, examples of the resin to be used include polyester-based resins, polyether-based resins, polyurethane-based resins, epoxy-based resins, phenol resin-based resins, polyamide-based resins, polyolefin-based resins, polyvinyl acetate-based resins, cellulose-based resins, (meth)acryl-based resins, polyimide-based resins, amino resins, rubbers, and silicone-based resins. When the transparent resin layer is laminated without using an adhesive, the lamination can be performed by a method such as an extrusion method, a sand lamination method, or a thermal lamination method.

[Back Adhesive Layer]

The back adhesive layer (not shown) is a layer which is provided on a side opposite to the outer surface of the decorative sheet if necessary for the purpose of improving adhesion with the molded resin during formation of the decorative resin molded article.

For the back adhesive layer, a thermoplastic resin or a curable resin is used depending on a molded resin which is used for the decorative resin molded article.

Examples of the thermoplastic resin which is used for forming the back adhesive layer include acrylic resins, acryl-modified polyolefin resins, chlorinated polyolefin resins, vinyl chloride/vinyl acetate copolymers, thermoplastic urethane resins, thermoplastic polyester resins, polyamide resins and rubber-based resins. These thermoplastic resins may be used alone, or may be used in combination of two or more thereof.

Examples of the thermosetting resin which is used for forming the back adhesive layer include urethane resins and epoxy resins. These thermosetting resins may be used alone, or may be used in combination of two or more thereof.

2. Decorative Resin Molded Article

A decorative resin molded article according to the first embodiment of the present disclosure is formed by integrating a molded resin with the decorative sheet according to the second embodiment of the present disclosure. That is, the decorative resin molded article according to the first embodiment is a decorative resin molded article having an uneven shape on an outer surface thereof, the decorative molded article including at least a first protective layer forming the uneven shape, a second protective layer, and a molded resin layer 6, in this order from the outer surface, the first protective layer being formed of a cured product of a resin composition containing an ionizing radiation curable resin and a thermoplastic resin, and the second protective layer being formed of a cured product of an ionizing radiation curable resin composition containing polycarbonate (meth)acrylate.

A decorative resin molded article according to the second embodiment is formed by integrating a molded resin with the decorative sheet according to the second embodiment. That is, a decorative resin molded article according to the second embodiment of the present disclosure is a decorative resin molded article having an uneven shape on an outer surface thereof, the decorative molded article including at least a first protective layer forming the uneven shape, a second protective layer, and the molded resin layer 6, in this order from the outer surface, the first protective layer being formed of a cured product of a resin composition containing an ionizing radiation curable resin and a thermoplastic resin, the second protective layer being formed of a cured product of an ionizing radiation curable resin composition, and the second protective layer having a tensile elastic modulus of 500 MPa or less at 23° C., and having no thermal softening point at 200° C. or lower.

The uneven shape of the first protective layer 1 of the decorative sheet is suitably imparted to the decorative resin molded article of the present disclosure. The uneven shape of the first protective layer 1 of the decorative sheet is likely to be significantly changed by heat and pressure during injection molding, but in the decorative sheet of the present disclosure, the uneven shape is effectively maintained. In the decorative resin molded article, the arithmetic mean roughness (Ra) of the surface of the first protective layer 1 is typically 0.1 to 30 μm, preferably 1 to 30 μm, more preferably 10 to 30 μm from the viewpoint of imparting an excellent design impression and the like from the uneven shape. The arithmetic mean roughness (Ra) is a value determined for the surface of the first protective layer 1 of the decorative resin molded article in accordance with JIS B 0601: 2001.

Figure 3:
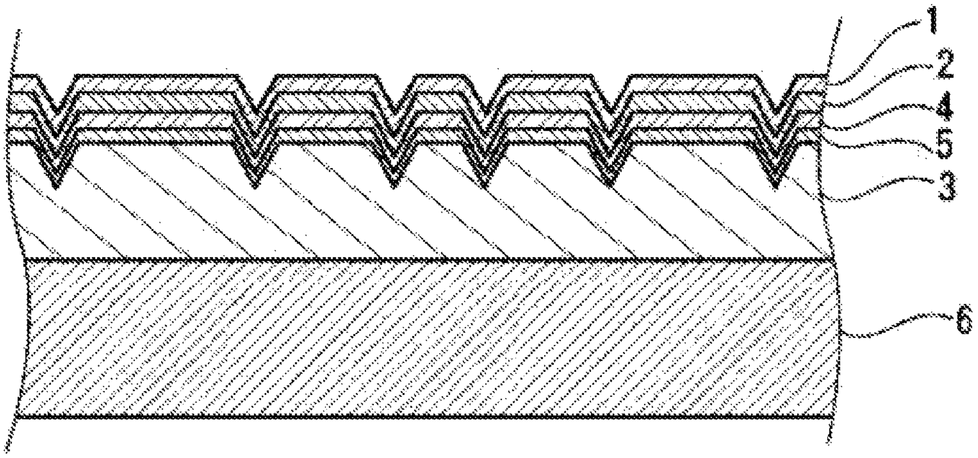
FIG. 3 is a schematic view of a cross-section structure of one form of a decorative resin molded article according to the present disclosure.

FIG. 3 shows a cross-section structure of one aspect of the decorative resin molded article of the present disclosure.

The decorative resin molded article of the present disclosure can be produced by a method including the step of forming a molded resin layer on the second protective layer 2 side (a surface on a side opposite to a surface having an uneven shape) by injecting a resin. Specifically, the decorative resin molded article is prepared by various injection molding methods such as an insert molding method, an injection molding simultaneous decorating method, a blow molding method and a gas injection molding method using the decorative sheet of the present disclosure.

In the insert molding method, first, the decorative sheet of the present disclosure is vacuum-molded (off-line premolding) into a molded article surface shape in advance using a vacuum molding die, and an unnecessary portion is then trimmed off if necessary to obtain a molded sheet in a vacuum molding step. The molded sheet is inserted into an injection molding die, the injection molding die is clamped, the fluidized resin is injected into the die and solidified, and the second protective layer 2 side of the decorative sheet is integrated with the outer surface of the resin molded product in parallel to the injection molding to produce a decorative resin molded article.

More specifically, the decorative resin molded article (or decorative resin molded article with a thermoplastic resin film layer) of the present disclosure is produced by an insert molding method including the following steps.

A vacuum molding step of molding the decorative sheet of the present disclosure into a three-dimensional shape by a vacuum molding die in advance;

a step of trimming an excess portion of the vacuum-molded decorative sheet to obtain a molded sheet; and a step of inserting the molded sheet obtained in the step into an injection molding die, closing the injection molding die, and injecting a fluidized resin into the die to integrate the resin with the molded sheet.

In the vacuum molding step in the insert molding method, the decorative sheet may be heated and molded. The heating temperature at this time is not particularly limited, and may be appropriately selected depending on the type of resin for forming the decorative sheet, the thickness of the decorative sheet, and the like. For example, when an ABS resin film is used for the base material layer, the heating temperature can be typically about 100 to 250° C., preferably about 130 to 200° C. In the integration step, the temperature of the fluidized resin is not particularly limited, and can be typically about 180 to 320° C., preferably about 220 to 280° C.

In the injection molding simultaneous decorating method, the decorative sheet of the present disclosure is disposed in a female die also serving as a vacuum molding die, which is provided with a suction hole for injection molding, premolding (in-line premolding) is performed with the female die, the injection molding die is then clamped, the fluidized resin is injected and filled into the die, and solidified to integrate the second protective layer 2 side of the decorative sheet of the present disclosure with the outer surface of the resin molded product in parallel to the injection molding, thereby producing a decorative resin molded article.

More specifically, the decorative resin molded article (or decorative resin molded article with a thermoplastic resin film layer) of the present disclosure is produced by an injection molding simultaneous decorating method including the following steps:

a step of premolding a decorative sheet by placing the decorative sheet of the present disclosure in such a manner that the first protective layer 1 side of the decorative sheet faces a molding surface of a movable mold with the molding surface having a predetermined shape, followed by heating and softening the decorative sheet, and vacuum-sucking the decorative sheet from the movable mold side to bring the softened decorative sheet into close contact with the movable mold along the molding surface thereof;

an injection molding step of clamping the movable mold with the decorative sheet brought into close contact with the movable mold along the molding surface thereof and a fixed mold, then injecting and filling the fluidized resin into a cavity formed by both the molds, and thereby solidifying the resin to form a resin molded article, and integrating the resin molded article with the decorative sheet; and a step of separating the movable mold from the fixed mold to take out a resin molded article in which all the layers of the decorative sheet are laminated.

The heating temperature in the premolding step in the injection molding simultaneous decorating method is not particularly limited, may be appropriately selected depending on the type of resin for forming the decorative sheet, the thickness of the decorative sheet, and the like, and can be typically about 70 to 130° C. when a polyester resin film or an acrylic resin film is used for the base material layer. In the injection molding step, the temperature of the fluidized resin is not particularly limited, and can be typically about 180 to 320° C., preferably about 220 to 280° C.

The decorative resin molded article (decorative resin molded article with a thermoplastic resin film layer) of the present disclosure can also be produced by a decoration method including bonding the decorative sheet of the present disclosure onto a three-dimensional resin molded product (molded resin layer) prepared in advance, such as a vacuum press-bonding method.

In the vacuum press-bonding method, first the decorative sheet of the present disclosure and the resin molded product are placed in a vacuum press-bonding machine including a first vacuum chamber situated on the upper side and a second vacuum chamber situated on the lower side in such a manner that the decorative sheet is on the first vacuum chamber side and the resin molded body is on the second vacuum chamber side, and the second protective layer 2 side of the decorative sheet faces the resin molded body side. The two vacuum chambers are then evacuated. The resin molded body is placed on a lift table that is provided on the second vacuum chamber side and is capable of moving up and down. Then, the first vacuum chamber is pressurized, and the molded body is pressed against the decorative sheet with the lift table, and by using a pressure difference between the two vacuum chambers, the decorative sheet is bonded to the surface of the resin molded body while being stretched. Finally, the two vacuum chambers are released to atmospheric pressure, and an unnecessary portion of the decorative sheet is trimmed off if necessary, whereby the decorative resin molded article of the present disclosure can be obtained.

Preferably, the vacuum press-bonding method includes the step of heating the decorative sheet for softening the decorative sheet to improve the moldability thereof before the step of pressing the molded product against the decorative sheet. The vacuum press-bonding method including such a step may be referred to particularly as a vacuum heating and press-bonding method. The heating temperature in the step is not particularly limited, may be appropriately selected depending on the type of resin for forming the decorative sheet, the thickness of the decorative sheet, and the like, and can be typically about 60 to 200° C. when a polyester resin film or an acrylic resin film is used for the base material layer.

In the decorative resin molded article of the present invention, a molded resin appropriate to an intended use may be selected to form the molded resin layer. The molding resin may be a thermoplastic resin or may be a thermosetting resin.

Specific examples of the thermoplastic resin to be used as a molded resin include polyolefin-based resins such as polyethylene and polypropylene, ABS resins, styrene resins, polycarbonate resins, acrylic resins and vinyl chloride resins. These thermoplastic resins may be used alone, or may be used in combination of two or more thereof.

Examples of the thermosetting resin to be used as a molded resin include urethane resins and epoxy resins. These thermosetting resins may be used alone, or may be used in combination of two or more thereof.

The decorative resin molded article according to the present disclosure has excellent chemical resistance, abrasion resistance and the like, and therefore can be used for, for example, interior materials or exterior materials of vehicles such as automobiles; carpentry members such as baseboards and cornices; fittings such as window frames and door frames; interior materials of buildings such as walls, floors and ceilings; housings of household electric appliances such as television receivers and air conditioners; and containers etc.

EXAMPLES

The first embodiment of the present disclosure will be described in detail by giving Example 1A and Comparative Examples 1A to 4A below. The second embodiment of the present disclosure will be described in detail by giving Examples 1B to 5B and Comparative Examples 1B and 2B below. However, the present disclosure is not limited to examples.

Example 1A

An ABS resin film (thickness: 475 μm) was used as a base material layer. A pattern layer (solid pattern layer (thickness: 5 μm)) was formed on the base material layer by gravure printing using an ink composition containing an acrylic resin. Next, a primer layer resin composition containing a binder resin including a two-liquid curable resin containing 100 parts by mass of a main component (acrylic polyol/urethane, mass ratio 9/1) and 7 parts by mass of a curing agent (hexamethylene diisocyanate) was applied onto the pattern layer, and dried to form a primer layer having a thickness of 2 μm, thereby obtaining a laminate with a base material layer, a pattern layer and a primer layer laminated in this order.

Next, embossing was performed on the primer layer side of the obtained laminate to form an uneven shape on the primer layer. As the embossing plate, one having a stripe pattern and an embossing plate depth of 40 μm was used. Next, for forming a second protective layer, an ionizing radiation curable resin (EB resin A shown in Table 1, which will be described later in detail) was applied to a thickness of 10 μm (thickness of the convex portion of the uneven shape of the second protective layer) after curing to form an uncured resin layer. An accelerating voltage of 165 kV and an irradiation dose of 50 kGy (5 Mrad) were applied onto the uncured resin layer to cure the uncured resin layer. Next, for forming a first protective layer, a resin composition obtained by blending a thermoplastic resin (acrylic resin) with an ionizing radiation resin (EB resin B shown in Table 1, which will be described later in detail) was applied to a thickness of 10 μm (thickness of the convex portion of the uneven shape of the second protective layer) after curing to form an uncured resin layer. As in the case of the second protective layer, an accelerating voltage of 165 kV and an irradiation dose of 50 kGy (5 Mrad) were applied onto the uncured resin layer to cure the uncured resin layer, so that a first protective layer having an uneven shape and a second protective layer were formed to obtain a decorative sheet. The uneven shape of the surface layer corresponds to the uneven shape of the primer layer.

Next, a decorative resin molded article was produced using the obtained decorative sheet. Specifically, the decorative sheet was heated at 280° C. for 20 seconds with an infrared heater, and premolded so as to follow the shape (plate shape) of the inside of a mold by vacuum molding (maximum draw ratio: 50%). Next, premolded article was fitted into the mold, the injected resin was injected into the cavity of the die to integrally mold the decorative sheet and the injected resin, and the molded product was taken out from the mold to obtain a decorative resin molded article.

Comparative Examples 1A and 2A

Except that the second protective layer was not formed, and resins shown in Table 1 were used for the first protective layer, the same procedure as in Example 1 was carried out to obtain decorative sheets and decorative resin molded articles.

Comparative Example 3A

Except that the second protective layer was not formed, and resins shown in Table 1 were used as resins for forming the first protective layer and the second protective, the same procedure as in Example 1A was carried out to obtain a decorative sheet and a decorative resin molded article.

Comparative Example 4A

Except that as shown in Table 1, a protective layer was not formed, the same procedure as in Example 1A was carried out to obtain a decorative sheet and a decorative resin molded article.

The resins for the first protective layer and the second protective layer which are shown in Table 1 are as follows. The mixing ratio (mass ratio) of the EB resin B to the acrylic resin is 1:3.

EB resin A: 95 parts by mass of difunctional urethane acrylate having a polycarbonate backbone (weight average molecular weight of 20,000) and 5 parts by mass of hexafunctional urethane acrylate (weight average molecular weight of 3,000)

EB resin B: difunctional urethane acrylate monomer (molecular weight: 500)

Acrylic resin: acrylic polymer (weight average molecular weight: 120000)

Δ: The design impression from the uneven shape seems to decrease as compared to that before molding.

x: The design impression from the uneven shape is lost.

<Chemical Resistance of Decorative Sheet>

5 ml of a sunscreen cosmetic was dropped to a surface of each of the decorative sheets obtained as described above, and the decorative sheet was left standing in an oven at 60° C. for 4 hours. Next, the decorative sheet was taken out, the surface was washed with a neutral detergent liquid, the state of the drop portion was then visually observed, and the chemical resistance of the decorative sheet was evaluated on the basis of the following criteria. Table 1 shows the results. The sunscreen cosmetic used is a commercially available product, contains avobenzone (3%), homosalate (10%), octisalate (5%), octocrylene (2.8%) and oxybenzone (6%) as components, and has a high resin surface eroding property.

◎: There is no change in appearance of the surface of the decorative sheet.

○: A slight gloss change occurs on the surface of the decorative sheet, but does not significantly impair the design.

Δ: A gloss change occurs on the surface of the decorative sheet, but is acceptable in practical use.

x: Whitening, swelling or dissolution occurs on the surface of the decorative sheet.

TABLE 1

| | Example 1A | Comparative Example 1A | Comparative Example 2A | Comparative Example 3A | Comparative Example 4A |
|---|---|---|---|---|---|
| First protective layer | EB resin B + Acrylic resin | EB resin A | EB resin B + Acrylic resin | EB resin A | — |
| Second protective layer | EB resin A | — | — | EB resin B + Acrylic resin | — |
| Arithmetic mean roughness of decorative sheet Ra (μm) | 12.0 | 13.5 | 13.8 | 11.3 | 16.8 |
| Arithmetic mean roughness of decorative resin molded article Ra (μm) | 1.5 | 1.6 | 0.8 | 1.4 | 0.5 |
| Unevenness retainability | ○ | ○ | Δ | ○ | X |
| Chemical resistance of decorative sheet | ○ | X | ○ | X | X |

<Measurement of Surface Roughness of Decorative Sheet>

The surface roughness (arithmetic mean roughness (Ra)) of the outer surface of each of the decorative sheets obtained as described above was measured as specified in JIS B 0601: 2001. As a measuring apparatus, a surface roughness measuring device (trade name "SURFCORDER SE-30 K" manufactured by Kosaka Laboratory Ltd. was used. Table 1 shows the measurement results.

<Measurement of Surface Roughness of Decorative Resin Molded Article>

The arithmetic mean roughness (Ra) of the outer surface of each decorative resin molded article was measured in the same manner as described in <Measurement of surface roughness of decorative sheet> above. Table 1 shows the measurement results.

<Unevenness Retainability>

For the appearance of each decorative resin molded article, a change from the appearance of each decorative sheet before molding was examined, and evaluation was performed on the basis of the following criteria. Table 1 shows the results.

◎: The design impression from the uneven shape does not change from that before molding.

○: The appearance slightly changes from that before molding, but there is no significant change in design impression from the uneven shape.

Example 1B

An ABS resin film (thickness: 475 μm) was used as a base material layer. A pattern layer (solid pattern layer (thickness: 5 μm)) was formed on the base material layer by gravure printing using an ink composition containing an acrylic resin. Next, a primer layer resin composition containing a binder resin including a two-liquid curable resin containing 100 parts by mass of a main component (acrylic polyol/urethane, mass ratio 9/1) and 7 parts by mass of a curing agent (hexamethylene diisocyanate) was applied onto the pattern layer, and dried to form a primer layer having a thickness of 2 μm, thereby obtaining a laminate with a base material layer, a pattern layer and a primer layer laminated in this order.

Next, embossing was performed on the primer layer side of the obtained laminate to form an uneven shape on the primer layer. As the embossing plate, one having a stripe pattern and an embossing plate depth of 40 μm was used. Next, for forming a second protective layer, an ionizing radiation curable resin (EB resin A1 described later) was applied to a thickness of 10 μm (thickness of the convex portion of the uneven shape of the second protective layer) after curing to form an uncured resin layer. An accelerating voltage of 165 kV and an irradiation dose of 50 kGy (5 Mrad) were applied onto the uncured resin layer to cure the uncured resin layer. Next, for forming a first protective layer, a resin composition obtained by blending an ionizing radiation resin (EB resin B1 described later) with thermoplastic resin (acrylic resin, weight average molecular weight: 120000) at a mass ratio of 1:3 was applied to a thickness of 10 μm (thickness of the convex portion of the uneven shape of the second protective layer) after curing to form an uncured resin layer. As in the case of the second protective layer, an accelerating voltage of 165 kV and an irradiation dose of 50 kGy (5 Mrad) were applied onto the uncured resin layer to cure the uncured resin layer, so that a first protective layer having an uneven shape and a second protective layer were formed to obtain a decorative sheet. The uneven shape of the surface layer corresponds to the uneven shape of the primer layer.

Next, a decorative resin molded article was produced using the obtained decorative sheet. Specifically, the decorative sheet was heated at 280° C. for 20 seconds with an infrared heater, and premolded so as to follow the shape (plate shape) of the inside of a mold by vacuum molding (maximum draw ratio: 50%). Next, premolded article was fitted into the mold, the injected resin was injected into the cavity of the die to integrally mold the decorative sheet and the injected resin, and the molded product was taken out from the mold to obtain a decorative resin molded article.

Example 2B

Except that an EB resin A2 described later was used as the ionizing radiation curable resin for forming the second protective layer, the same procedure as in Example 1B was carried out to obtain a decorative sheet and a decorative resin molded article.

Example 3B

Except that an EB resin A3 described later was used as the ionizing radiation curable resin for forming the second protective layer, the same procedure as in Example 1B was carried out to obtain a decorative sheet and a decorative resin molded article.

Example 4B

Except that an EB resin B2 described later was used as the ionizing radiation curable resin for forming the first protective layer, and the mass ratio of the ionizing radiation curable resin with the thermoplastic resin was changed to 1:2, the same procedure as in Example 1B was carried out to obtain a decorative sheet and a decorative resin molded article.

Example 5B

Except that an EB resin A4 described later was used as the ionizing radiation curable resin for forming the second protective layer, the same procedure as in Example 1B was carried out to obtain a decorative sheet and a decorative resin molded article.

Comparative Example 1B

Except that the second protective layer was formed of a resin composition obtained by blending an ionizing radiation curable resin (EB resin C1 described later) with a thermoplastic resin (butyral resin) at a mass ratio of 1:1, the same procedure as in Example 1B was carried out to obtain a decorative sheet and a decorative resin molded article.

Comparative Example 2B

Except that an EB resin C2 described later was used as the ionizing radiation curable resin for forming the second protective layer, and an acrylic resin was used as the thermoplastic resin for forming the second protective layer, the same procedure as in Comparative Example 1B was carried out to obtain a decorative sheet and a decorative resin molded article.

The resins for the first protective layer and the second protective layer which are shown in Table 2 are as follows.

EB resin A1: 95 parts by mass of difunctional urethane acrylate having a polycarbonate backbone (weight average molecular weight of 20,000) and 5 parts by mass of hexafunctional urethane acrylate (weight average molecular weight of 3,000)

EB resin A2: 95 parts by mass of difunctional urethane acrylate having a polycarbonate backbone (weight average molecular weight of 20,000) and 5 parts by mass of hexafunctional urethane acrylate (weight average molecular weight of 3,000)

EB resin A3: 30 parts by mass of difunctional urethane acrylate having a polycarbonate backbone (weight average molecular weight of 20,000) and 70 parts by mass of hexafunctional urethane acrylate (weight average molecular weight of 3,000)

EB resin A4: 50 parts by mass of difunctional urethane acrylate having a polycarbonate backbone (weight average molecular weight of 20,000) and 50 parts by mass of hexafunctional urethane acrylate (weight average molecular weight of 3,000)

EB resin B1: difunctional urethane acrylate monomer (molecular weight: 500)

EB resin B2: difunctional urethane acrylate monomer (weight average molecular weight: 3000)

EB resin C1: hexafunctional urethane acrylate monomer (weight average molecular weight: 7000)

EB resin C2: 60 parts by mass of difunctional polyester acrylate oligomer (weight average molecular weight: 10000) and 40 parts by mass of a hexafunctional urethane acrylate oligomer (weight average molecular weight of 7000)

Acrylic resin: polymethyl methacrylate (weight average molecular weight: 120000, softening temperature: 80° C.)

Butyral resin: polyvinyl butyral (weight average molecular weight: 5000, softening temperature: 60° C.)

<Tensile Elastic Modulus>

The tensile elastic moduli of the first protective layer and the second protective layer were measured by the following method. The first protective layer or the second protective layer was prepared with a thickness of 30 μm, and taken as a test sample having a width of 25 mm and a length of 80 mm. Specifically, the ionizing radiation curable resin compositions used for formation of the first protective layer and the second protective layer were each applied onto a polyethylene terephthalate film, cured to obtain a cured film with a thickness of 30 μm, and the cured film was peeled from the polyethylene terephthalate film, and cut to the predetermined size to obtain a test sample. Using a Tensilon versatile material tester (Tensilon Versatile Material Tester RTC-1250A manufactured by ORIENTEC CORPORATION), the tensile elastic modulus of the test sample was measured under conditions of a chuck-to-chuck distance of 50 mm and a tension speed of 1000 mm/min in an environment at 23° C. or 150° C. Table 2 shows the results.

<Thermal Softening Point>

The thermal softening point of the second protective layer was measured as follows. The second protective layer 2 was prepared with a thickness of 30 μm, and taken as a test sample having a width of 25 mm and a length of 80 mm. Specifically, the ionizing radiation curable resin composition used for formation of the second protective layer was applied onto a polyethylene terephthalate film, cured to obtain a cured film with a thickness of 30 μm, and the cured film was peeled from the polyethylene terephthalate film, and cut to the predetermined size to obtain a test sample. Using a thermal analyzer (TMA), the temperature was elevated from room temperature (25° C.) to 200° C. at a temperature elevation rate of 5° C./min to examine whether or not the test sample had a thermal softening point. The start temperature was set to 25° C. because it is not considered that a thermal softening point is present at a temperature of 25° C. or lower. Table 2 shows the results.

<Moldability>

The obtained decorative sheet was subjected to vacuum molding to evaluate moldability. Each decorative sheet was heated to 160° C. with an infrared to be softened. Subsequently, vacuum molding was performed with a vacuum molding die (maximum draw ratio: 200%) to mold the decorative sheet into an internal shape of the die. The decorative sheet was cooled, the decorative sheet was then released from the die, and moldability was evaluated on the basis of the following criteria. Table 2 shows the results.

○: Minute cracking of the coating film or whitening does not occur in the three-dimensionally formed portion or the maximally stretched portion.

Δ: Slight cracking of the coating film or whitening occurs in the three-dimensionally formed portion or the maximally stretched portion.

x: It is not possible to follow the shape of the die, and cracking of the coating film and whitening occur on the surface.

<Unevenness Retainability>

For the appearance of each decorative resin molded article, a change from the appearance of each decorative sheet before molding was examined, and evaluation was performed on the basis of the following criteria. Table 2 shows the results.

⊚: The design impression from the uneven shape does not change from that before molding.

○: The appearance slightly changes from that before molding, but there is no significant change in design impression from the uneven shape.

Δ: The design impression from the uneven shape seems to decrease as compared to that before molding.

x: The design impression from the uneven shape is lost.

<Chemical Resistance of Decorative Sheet>

5 ml of a sunscreen cosmetic was dropped to a surface of each of the decorative sheets obtained as described above, and the decorative sheet was left standing in an oven at 60° C. for 4 hours. Next, the decorative sheet was taken out, the surface was washed with a neutral detergent liquid, the state of the drop portion was then visually observed, and the chemical resistance of the decorative sheet was evaluated on the basis of the following criteria. Table 2 shows the results. The sunscreen cosmetic used is a commercially available product, contains avobenzone (3%), homosalate (10%), octisalate (5%), octocrylene (2.8%) and oxybenzone (6%) as components, and has a high resin surface eroding property.

⊚: There is no change in appearance of the surface of the decorative sheet.

○: A slight gloss change occurs on the surface of the decorative sheet, but does not significantly impair the design.

Δ: A gloss change occurs on the surface of the decorative sheet, but is acceptable in practical use.

x: Whitening, swelling or dissolution occurs on the surface of the decorative sheet.

<Scratch Resistance>

A surface of the decorative sheet on the first protective layer side was rubbed back and forth 10 times with a nail, and the scratched state was visually observed, and evaluated on the basis of the following criteria. Table 2 shows the results.

○: There are no scratches.

Δ: Slight scratches are observed.

x: The coating film is scraped, and significant scratches are observed.

TABLE 2

| | | Example 1B | Example 2B | Example 3B | Example 4B | Example 5B | Comparative Example 1B | Comparative Example 2B |
|---|---|---|---|---|---|---|---|---|
| First protective layer | Resin | EB resin B1:acrylic resin = 1:3 | EB resin B1:acrylic resin = 1:3 | EB resin B1:acrylic resin = 1:3 | EB resin B2:acrylic resin = 1:2 | EB resin B1:acrylic resin = 1:3 | EB resin B1:acrylic resin = 1:3 | EB resin B1:acrylic resin = 1:3 |
| | Tensile elastic modulus (23° C.) | 1500 MPa | 1500 MPa | 1500 MPa | 800 MPa | 1500 MPa | 1500 MPa | 1500 MPa |
| | Tensile elastic modulus (150° C.) | 30 MPa | 30 MPa | 30 MPa | 20 MPa | 30 MPa | 30 MPa | 30 MPa |
| Second protective layer | Resin | EB resin A1 | EB resin A2 | EB resin A3 | EB resin A1 | EB resin A4 | EB resin C1:butyral resin = 1:1 | EB resin C2:acrylic resin = 1:1 |
| | Tensile elastic modulus (23° C.) | 80 MPa | 50 MPa | 200 MPa | 80 MPa | 400 MPa | 1300 MPa | 450 MPa |
| | Thermal softening temperature at 200° C. or lower | None | None | None | None | None | Present (60° C.) | Present (80° C.) |
| Moldability | | ○ | ○ | ○ | ○ | Δ | ○ | ○ |
| Unevenness retainability | | ○ | ○ | ○ | ○ | ○ | X | X |
| Chemical resistance of decorative sheet | | ○ | ○ | ○ | Δ | ○ | ○ | ○ |
| Scratch resistance | | ○ | ○ | ○ | Δ | ○ | ○ | ○ |

DESCRIPTION OF REFERENCE SIGNS

1: First protective layer
2: Second protective layer
3: Base material layer
4: Primer layer
5: Pattern layer
6: Molded resin layer

The invention claimed is:

1. A decorative sheet having an uneven shape on an outer surface thereof,
the decorative sheet comprising at least a first protective layer forming the uneven shape, a second protective layer, a pattern layer, and a base material layer, in this order from the outer surface,
the base material layer, the pattern layer, and the second protective layer have a same uneven shape as the uneven shape of the first protective layer,
the first protective layer being formed of a cured product of a resin composition containing an ionizing radiation curable resin and a thermoplastic resin, wherein, the ionizing radiation curable resin contains polyfunctional (meth)acrylate oligomers or polyfunctional (meth) acrylate monomers, and the thermoplastic resin contains an acrylic resin,
the second protective layer being formed of a cured product of an ionizing radiation curable resin composition containing polycarbonate (meth)acrylate,
the first protective layer being formed on the entire outer surface of the decorative sheet,
the first protective layer being the outermost layer of the decorative sheet.

2. A decorative sheet having an uneven shape on an outer surface thereof,
the decorative sheet comprising at least a first protective layer forming the uneven shape, a second protective layer, a pattern layer, and a base material layer, in this order from the outer surface,
the base material layer, the pattern layer, and the second protective layer have a same uneven shape as the uneven shape of the first protective layer,
the first protective layer being formed of a cured product of a resin composition containing an ionizing radiation curable resin and a thermoplastic resin,
the second protective layer being formed of a cured product of an ionizing radiation curable resin composition, and
the second protective layer having a tensile elastic modulus of 500 MPa or less at 23° C., and having no thermal softening point at 200° C. or lower.

3. The decorative sheet according to claim 1, wherein in the first protective layer, the resin composition contains the ionizing radiation curable resin and the thermoplastic resin at a mass ratio of 10:90 to 25:75.

4. The decorative sheet according to claim 1, wherein in the first protective layer, a weight average molecular weight of the thermoplastic resin is in the range of 90000 or more and 150000 or less.

5. The decorative sheet according to claim 1, wherein in the first protective layer, a number of functional groups of a monomer contained in the ionizing radiation curable resin is in the range of 2 to 6.

6. The decorative sheet according to claim 1, wherein in the first protective layer, a molecular weight of a monomer contained in the ionizing radiation curable resin is in the range of 200 or more and 2000 or less.

7. The decorative sheet according to claim 1, wherein a base material layer is laminated on a surface of the second protective layer on a side opposite to the first protective layer.

8. The decorative sheet according to claim 1, wherein a primer layer is laminated on a surface of the second protective layer on a side opposite to the first protective layer.

9. The decorative sheet according to claim 1, wherein an arithmetic mean roughness Ra of the outer surface is 0.1 μm or more and 100 μm or less.

10. The decorative sheet according to claim 1, which is used in an insert molding method or an injection molding simultaneous decorating method.

11. A decorative resin molded article having an uneven shape on an outer surface thereof,
the decorative resin molded article comprising at least a first protective layer forming the uneven shape, a second protective layer, a pattern layer, a base material layer and a molded resin layer, in this order from the outer surface,
the base material layer, the pattern layer, and the second protective layer have a same uneven shape as the uneven shape of the first protective layer,
the first protective layer being formed of a cured product of a resin composition containing an ionizing radiation curable resin and a thermoplastic resin,
the second protective layer being formed of a cured product of an ionizing radiation curable resin composition containing polycarbonate (meth)acrylate, and
the first protective layer being formed on the entire outer surface of the decorative resin molded article.

12. A decorative resin molded article having an uneven shape on an outer surface thereof,
the decorative resin molded article comprising at least a first protective layer forming the uneven shape, a second protective layer, a pattern layer, a base material layer and a molded resin layer, in this order from the outer surface,
the base material layer, the pattern layer, and the second protective layer have a same uneven shape as the uneven shape of the first protective layer,
the first protective layer being formed of a cured product of a resin composition containing an ionizing radiation curable resin and a thermoplastic resin,
the second protective layer being formed of a cured product of an ionizing radiation curable resin composition, and
the second protective layer having a tensile elastic modulus of 500 MPa or less at 23° C., and having no thermal softening point at 200° C. or lower.

13. A method for producing a decorative resin molded article, the method comprising the step of laminating a molded resin layer on a surface of the decorative sheet according to claim 1 on a side opposite to a surface having the uneven shape by injecting a resin.

14. The decorative sheet according to claim 2, wherein the second protective layer has an uneven shape along the uneven shape of the first protective layer.

15. The decorative sheet according to claim 2, wherein in the first protective layer, the resin composition contains the ionizing radiation curable resin and the thermoplastic resin at a mass ratio of 10:90 to 25:75.

16. The decorative sheet according to claim 2, wherein in the first protective layer, a weight average molecular weight of the thermoplastic resin is in the range of 90000 or more and 150000 or less.

17. The decorative sheet according to claim 2, wherein in the first protective layer, a number of functional groups of a monomer contained in the ionizing radiation curable resin is in the range of 2 to 6.

18. The decorative sheet according to claim 2, wherein in the first protective layer, a molecular weight of a monomer contained in the ionizing radiation curable resin is in the range of 200 or more and 2000 or less.

19. The decorative sheet according to claim 2, wherein a base material layer is laminated on a surface of the second protective layer on a side opposite to the first protective layer.

* * * * *